United States Patent [19]

Nishizawa et al.

[11] Patent Number: 5,607,808
[45] Date of Patent: Mar. 4, 1997

[54] LIQUID TONER, INK COMPOSITION, AND METHODS OF PRODUCING THE SAME

[75] Inventors: Masumi Nishizawa; Masayuki Iijima; Takashi Miyama, all of Tokyo, Japan

[73] Assignee: Dai Nippon Printing Co., Ltd., Tokyo, Japan

[21] Appl. No.: 659,244

[22] Filed: Jun. 5, 1996

Related U.S. Application Data

[62] Division of Ser. No. 413,116, Mar. 29, 1995, Pat. No. 5,547,804.

[30] Foreign Application Priority Data

Mar. 29, 1994 [JP] Japan .................. 6-058547
Mar. 31, 1994 [JP] Japan .................. 6-063062

[51] Int. Cl.$^6$ .................. G03G 9/087; C09D 11/10
[52] U.S. Cl. .................. 430/137
[58] Field of Search .................. 430/137

[56] References Cited

U.S. PATENT DOCUMENTS

| | | | |
|---|---|---|---|
| 4,297,260 | 10/1981 | Ferree et al. | 524/292 |
| 4,389,499 | 6/1983 | Riesgraf | 524/525 |
| 4,794,651 | 12/1988 | Landa et al. | 430/114 |
| 4,855,207 | 8/1989 | Tsubuko et al. | 430/114 |
| 5,286,287 | 2/1994 | Hirasawa et al. | 106/22 K |

*Primary Examiner*—Roland Martin
*Attorney, Agent, or Firm*—Sughrue, Mion, Zinn, Macpeak & Seas

[57] ABSTRACT

A liquid toner and an ink composition, which comprise a dispersion of copolymer resin particles composed of at least two different monomer components in a dispersion medium. The copolymer resin particles and the dispersion medium are related to each other such that the difference $\Delta\delta^1$ between the solubility parameter value $\delta p^1$ of a homopolymer composed only of at least one monomer component in the copolymer resin and the solubility parameter value $\delta s^1$ of the dispersion medium is not smaller than 1.0, and that the difference $\Delta\delta^2$ between the solubility parameter value $\delta p^2$ of a homopolymer composed only of at least one other monomer component and the solubility parameter value $\delta s^1$ of the dispersion medium is not larger than 1.0, and further that the difference $\Delta$ between $\Delta\delta^1$ and $\Delta\delta^2$ ($\Delta\delta^1 - \Delta\delta^2$) is at least 0.5. Moreover, each copolymer resin particle comprises a nuclear portion which is insoluble in the dispersion medium, and an outer skin portion which wraps the nuclear portion, and which is soluble or swellable in the dispersion medium. The liquid toner is a dispersion of the copolymer resin particles in an electrically insulating dispersion medium. The liquid toner is free from sedimentation, aggregation or other problem even if the pigment content is increased, and hence excellent in dispersibility and free from gelation. The ink composition is a dispersion of the copolymer resin particles in a dispersion medium. Even if the pigment or other particle content is increased, sedimentation, aggregation or other problem will not occur. Thus, the ink composition exhibits excellent dispersibility and is free from gelation and superior in coatability.

4 Claims, No Drawings

LIQUID TONER, INK COMPOSITION, AND METHODS OF PRODUCING THE SAME

This is a divisional of Application No. 08/413,116 filed Mar. 29, 1995, now U.S. Pat. No. 5,547,804.

BACKGROUND OF THE INVENTION

The present invention relates to a liquid toner which is a dispersion of copolymer resin particles containing or not containing a pigment in an electrically insulating dispersion medium, and also relates to a method of producing the liquid toner. More specifically, the present invention relates to a liquid toner which is suitable for use in electrophotography, electrostatic printing, and electrostatic recording, and to a method of producing the liquid toner.

In general, liquid toners consist essentially of pigment particles which are dispersed in an electrically insulating dispersion medium. In development of an electrostatic latent image in electrophotography or the like, however, since development is carried out by an electric double layer of charge carriers formed at the area of contact between the pigment particle surfaces and the electrically insulating dispersion medium, even if a pigment is selected on the basis of color tone or the like, a developing system is determined by the electric charge owned by the pigment particles themselves. Moreover, the charging characteristics are different for different pigments.

Therefore, the conventional practice is to add a charge control agent to a liquid toner so that the charge control agent adheroes to the pigment particle surfaces, thereby adjusting the charging characteristics of the pigment particles in the toner. However, since a charge control agent, e.g. a metallic soap, is soluble in an electrically insulating dispersion medium, e.g. an aliphatic hydrocarbon, the charge control agent is readily desorbed from the pigment particle surfaces. Further, if the ratio of the pigment to the resin in the liquid toner is raised, the development properties of the liquid toner deteriorate with time because of sedimentation, aggregation, etc. of the pigment particles. Accordingly, the pigment proportion cannot be increased as desired.

The present applicant has previously found that a liquid toner which is free from problems such as aggregation of pigment particles, and which has high plate wear resistance, excellent transfer properties and high definition can be obtained by dissolving an olefin resin having a carboxyl group or an ester group in a solvent having high temperature dependence in terms of solubility in the olefin resin, e.g. toluene, under heating to prepare a resin solution, and then cooling the resin solution to precipitate resin particles, followed by, if necessary, replacing the solvent with an electrically insulating liquid which does not dissolve the resin. With regard to the above liquid toner, the present applicant has previously filed an application (Japanese Patent Application Post-Examination Publication No. 05-48468). However, there has been a demand for a liquid toner which is superior in dispersion stability in addition to the above-described various properties.

Further, the present invention relates to an ink composition which comprises a dispersion of copolymer resin particles containing or not containing a pigment in a dispersion medium, and also relates to a method of producing the ink composition. More particularly, the present invention relates to an ink composition which may be used as a gravure ink, an ink for color filter, a paint, etc.

In general, conventional ink compositions which have heretofore been used as gravure inks or the like consist essentially of a dispersion medium, particles of a binder resin and a pigment, which are soluble in the dispersion medium, and a dispersant. The conventional ink compositions suffer, however, from the problems that, as the content of pigment and other particles is increased, it becomes more likely that the pigment will be sedimented because of a density difference in the ink, and that aggregation of the pigment will be caused by electrostatic charge of the pigment. Accordingly, the pigment content must be undesirably set at a low level in order to improve the dispersibility of the pigment.

One approach to increase the pigment concentration while maintaining the dispersibility at a high level may be to increase the binder resin concentration, for example. However, if the binder resin concentration is increased, gelation is likely to occur, resulting in coatability being lost. In addition, even if the dispersant concentration is increased, there is a limit to the effectiveness obtained thereby. Thus, no satisfactory results can be obtained; on the contrary, there will be a rise in viscosity and a reduction in shelf stability.

SUMMARY OF THE INVENTION

A first object of the present invention is to provide a liquid toner which is superior in resin particle dispersion stability, and a method of producing the liquid toner.

To attain the above-described object, the present invention provides a liquid toner which comprises a. dispersion of copolymer resin particles composed of at least two different monomer components in an electrically insulating dispersion medium. The copolymer resin particles and the dispersion medium are related to each other such that the difference $\Delta\delta^1$ between the solubility parameter value (hereinafter referred to as "SP value") $\delta p^1$ of a homopolymer composed only of at least one monomer component in the copolymer resin and the SP value $\delta s^1$ of the dispersion medium is not smaller than 1.0, and that the difference $\Delta\delta^2$ between the SP value $\delta p^2$ of a homopolymer composed only of at least one other monomer component and the SP value $\delta s^1$ of the dispersion medium is not larger than 1.0, and further that the difference $\Delta$ between $\Delta\delta^1$ and $\Delta\delta^2$ ($\Delta\delta^1 - \Delta\delta^2$) is at least 0.5. Moreover, each copolymer resin particle comprises a nuclear portion which is insoluble in the dispersion medium, and an outer skin portion which wraps the nuclear portion, and which is soluble or swellable in the dispersion medium.

The liquid toner of the present invention is further characterized in that the copolymer resin particles in the liquid toner contain a pigment.

In addition, the present invention provides a method of producing a liquid toner in which a copolymer resin which is composed of at least two different monomer components is dissolved in a solvent to prepare a solution, and the resulting solution is mixed with an electrically insulating dispersion medium to carry out granulation for forming copolymer resin particles in such a relationship that the difference $\Delta\delta^1$ between the solubility parameter value $\delta p^1$ of a homopolymer composed only of at least one monomer component in the copolymer resin and the solubility parameter value $\delta s^1$ of the dispersion medium is not smaller than 1.0, and that the difference $\Delta\delta^2$ between the solubility parameter value $\delta p^2$ of a homopolymer composed only of at least one other monomer component and the solubility parameter value $\delta s^1$ of the dispersion medium is not larger than 1.0, and further that the difference $\Delta\delta^2$ between $\Delta\delta^1$ and $\Delta\delta^2$ ($\Delta\delta^1$—$\Delta\delta^2$) is at least 0.5. After the granulation step, the solvent is removed, thereby forming copolymer resin particles each comprising a nuclear portion which is insoluble in the dispersion medium, and an outer skin portion which wraps the nuclear portion, and which is soluble or swellable in the dispersion medium.

The liquid toner producing method of the present invention is further characterized in that the copolymer resin particles are formed in the presence of a pigment so that the copolymer resin particles contain the pigment.

The liquid toner of the present invention has been accomplished on the basis of the experimental finding that, if a liquid toner is formed by using copolymer resin particles and a dispersion medium having a specific SP value, as the proportions of monomers that constitute the copolymer resin change, the diameter of precipitated resin particles proportionally changes. In the process of investigating the law of the change of the resin particle diameter, we have found that, on the assumption that a copolymer resin is a combination of a homopolymer consisting only of one monomer component of the copolymer resin and another homopolymer consisting only of the other monomer component, the dissolution condition of the copolymer resin in the solvent can be defined by the solubility of each homopolymer in the solvent.

Regarding the configuration of the copolymer resin particles, the portion of each copolymer resin particle which is insoluble in the dispersion medium has no affinity for the dispersion medium, whereas the portion of each copolymer resin particle which is soluble or swellable in the dispersion medium has an affinity for the dispersion medium. Consequently, the copolymer resin particles have a double-layer particle structure in which the insoluble portion constitutes a nuclear portion, and the soluble or swellable portion constitutes an outer skin portion. By virtue of the surface affinity for the dispersion medium, neither aggregation nor precipitation occurs even if the particle concentration is increased. Thus, a liquid toner having excellent dispersion stability can be obtained.

Such copolymer resin particles can be formed by adding a solution of a copolymer resin in a good solvent to a dispersion medium having a specific SP value. In particular, if the granulation is carried out in the presence of a pigment, it is possible to obtain copolymer resin particles containing the pigment. The resin particle surface that wraps the pigment forms a soluble or swellable portion of the copolymer resin. Accordingly, even of each copolymer resin particle contains a pigment, there is no contact between pigment particles contained in respective copolymer resin particles, and yet the dispersion stability can be improved.

A second object of the present invention is to provide an ink composition which is free from sedimentation, aggregation or other similar problems even if the content of pigment or other particles is increased, and which is therefore excellent in dispersibility, free from gelation and superior in coatability, and also provide a method of producing the ink composition.

To attain the above-described object, the present invention provides an ink composition which comprises a dispersion of copolymer resin particles composed of at least two different monomer components in a dispersion medium. The copolymer resin particles and the dispersion medium are related to each other such that the difference $\Delta\delta^1$ between the solubility parameter value (hereinafter referred to as "SP value") $\delta p^1$ of a homopolymer composed only of at least one monomer component in the copolymer resin and the SP value $\delta s^1$ of the dispersion medium is not smaller than 1.0, and that the difference $\Delta\delta^2$ between the SP value $\delta^2$ of a homopolymer composed only of at least one other monomer component and the SP value $\delta s^1$ of the dispersion medium is not larger than 1.0, and further that the difference $\Delta$ between $\Delta\delta^1$ and $\Delta\delta^2$ ($\Delta\delta^1$—$\Delta\delta^2$) is at least 0.5. Moreover, each copolymer resin particle comprises a nuclear portion which is insoluble in the dispersion medium, and an outer skin portion which wraps the nuclear portion, and which is soluble or swellable in the dispersion medium.

The ink composition of the present invention is further characterized in that the copolymer resin particles in the ink composition contain a pigment.

In addition, the present invention provides a method of producing an ink composition in which a copolymer resin which is composed of at least two different monomer components is dissolved in a solvent to prepare a solution, and the resulting solution is mixed with a dispersion medium to carry out granulation for forming copolymer resin particles in such a relationship that the difference $\Delta\delta^1$ between the SP value $\delta p^1$ of a homopolymer composed only of at least one monomer component in the copolymer resin and the SP value of the dispersion medium is not smaller than 1.0, and that the difference $\Delta\delta^2$ between the SP value $\delta p^2$ of a homopolymer composed only of at least one other monomer component and the SP value of the dispersion medium is not larger than 1.0, and further that the difference $\Delta$ between $\Delta\delta^1$ and $\Delta\delta^2$ ($\Delta\delta^1$–$\Delta\delta^2$) is at least 0.5. After the granulation step, the solvent is removed, thereby forming copolymer resin particles each comprising a nuclear portion which is insoluble in the dispersion medium, and an outer skin portion which wraps the nuclear portion, and which is soluble or swellable in the dispersion medium.

The ink composition producing method of the present invention is further characterized in that the copolymer resin particles are formed in the presence of a pigment so that the copolymer resin particles contain the pigment.

The ink composition of the present invention has been accomplished on the basis of the experimental finding that, if an ink composition is formed by using copolymer resin particles and a dispersion medium having a specific SP value, as the proportions of monomers that constitute the copolymer resin change, the diameter of precipitated resin particles proportionally changes. In the process of investigating the law of the change of the resin particle diameter, we have found that, on the assumption that a copolymer resin is a combination of a homopolymer consisting only of one monomer component of the copolymer resin and another homopolymer consisting only of the other monomer component, the dissolution condition of the copolymer resin in the solvent can be defined by the solubility of each homopolymer in the solvent.

Regarding the configuration of the copolymer resin particles in the dispersion medium, the portion of each copolymer resin particle which is insoluble in the dispersion medium has no affinity for the dispersion medium, whereas the portion of each copolymer resin particle which is soluble or swellable in the dispersion medium has an affinity for the dispersion medium. Consequently, the copolymer resin particles have a double-layer particle structure in which the insoluble portion constitutes a nuclear portion, and the soluble or swellable portion constitutes an outer skin portion. By virtue of the surface affinity for the dispersion medium, neither aggregation nor precipitation occurs even if the particle concentration is increased. Thus, an ink composition having excellent dispersion stability and superior coatability can be obtained.

Such copolymer resin particles can be formed by adding a solution of a copolymer resin in a good solvent to a dispersion medium having a specific SP value. In particular, if the granulation is carried out in the presence of a pigment, it is possible to obtain copolymer resin particles containing the pigment. The resin particle surface that wraps the pigment forms a soluble or swellable portion of the copolymer resin. Accordingly, even if each copolymer resin particle contains a pigment, there is no contact between pigment particles contained in respective copolymer resin particles, and yet the dispersion stability can be improved.

If the dispersion of the copolymer resin particles in the dispersion medium is mixed with additives such as a binder according to the use application and the demanded physical properties, it is possible to produce an ink composition which is useful, for example, as a gravure ink, an ink for color filter, a paint, etc.

The liquid toner and ink composition of the present invention have features which are common to each other in that they are each formed by dispersing copolymer resin particles composed of at least two different monomer components in a dispersion medium.

In general, SP values are known as being indicative of compatibility or incompatibility between substances. Taking the relationship between a resin and a solvent therefor by way of example, the degree of solubility of the resin in the solvent can be shown by the SP values: If the difference between the SP values of the resin and the solvent is small, the solubility of the resin in the solvent is high, whereas, if the difference is large, the solubility is low. If the difference is very large, the resin is insoluble in the solvent.

The following are examples of known methods of measuring SP values of resins:

(1) Dissolution method, i.e. a method in which the SP value of a resin is estimated from the SP value of a solvent which dissolves the resin (H. Burrell, Official Digest, 27 (369), 726 (1950));

(2) Swelling method, i.e., a method in which the SP value of a resin which is difficult to dissolve is estimated from the SP value of a solvent in which the degree of swelling is the highest (the same as the above);

(3) Method in which the SP value of a resin is obtained from the intrinsic viscosity of the resin, i.e., a method in which, since the intrinsic viscosity of a resin in a solvent shows the largest value when the SP value of the resin and the SP value of the solvent coincide with each other, the resin concerned is dissolved in solvents having various SP values, and the intrinsic viscosity is measured for each solvent, thereby estimating the SP value of the resin from the solubility parameter value of the solvent that gives the largest intrinsic viscosity value (H. Ahmed, M. Yassen, J. Coat. Technol., 50,86 (1970), W. R. Song, D. W. Brownawell, Polym. Eng. Sci., 10,222 (1970)); and (4) Method in which the SP value of a resin is obtained from the molecular attraction constant, i.e. a method in which the SP value is obtained from the molecular attraction constant (G) of each functional group or atom group constituting a resin molecule according to the equation of SP value=$\Sigma G/V$ (D. A. Small, J. Appl. Chem., 3,71, (1953), K. L. Hoy, J. Paint Technol., 42,76 (1970)).

In the following description of the present invention, a value that is obtained from the molecular attraction constant is used as an SP value of a resin, and the SP value of each solvent is shown by using a value that is obtained in view of the attraction force between molecules on the basis of Hildebrand-Scatchard's theory of solution (J. H. Hildebrand, R. L. Scott, "The Solubility of Nonelectrolytes" 3rd Ed., Reinhold Publishing cop., New York (1949), G. Scatchard, Chem. Rev., 8,321 (1931). The SP value is expressed by SP value $(\delta)=(\Delta E_v/\Delta V_1)^{1/2}$ (where $\Delta E_v$: vaporization energy; $V_1$: molecular volume; and $\Delta E_v/V_1$: cohesive energy)

In the present invention, the SP value at 25° C. which is described in K. L. Hoy, J. Paint Technol., 42,76 (1970), is used.

The relationship between the SP values of a resin and a solvent will be explained below by way of an example in which a resin is to be dissolved in a solvent. Polystyrene, which has an SP value of 9.1, is very soluble in tetrahydrofuran, which has an SP value of 9.1, and soluble in solvents having an SP value in the range of from 8.5 to 9.3. However, polystyrene is insoluble in n-hexane, which has an SP value of 7.3. Thus, the condition of a resin in a solvent can be presumed from the difference between the SP values of the resin and the solvent.

Incidentally, resin particles can be precipitated by a process in which, after a resin has been dissolved in a good solvent so that a relatively dilute solution is obtained, the solution is added to a poor solvent, and then the good solvent is removed. It may be considered that, in the good solvent, the resin is present in monomolecular form with the molecular chain expanded, but in the poor solvent, the molecular chain contracts, and resin particles are precipitated. Accordingly, the condition of the resin particles in the solvent differs according to whether the poor solvent used is a solvent which has such an SP value difference that the resin swells therein, or a solvent which has an SP value difference that is so large that the resin is completely insoluble therein. In general, as the weightaverage molecular weight of a resin increases, the diameter of resin particles formed increases.

Thus, there is the above-described general relationship between a resin and a solvent. The present inventors have experimentally found that, if copolymer resin particles are dissolved in a solvent having a specific SP value, as the proportions of monomers that constitute the copolymer resin change, the diameter of precipitated resin particles proportionally changes.

In the process of investigating the law of the change of the resin particle diameter, we have found that, on the assumption that a copolymer resin which is composed of at least two monomer components is a combination of a homopolymer consisting only of at least one monomer component of the copolymer resin and another homopolymer consisting only of at least one other monomer component, the dissolution condition of the copolymer resin in the solvent can be defined by the solubility of each homopolymer in the solvent.

Based on the above-described consideration, the present invention specifies the relationship between the copolymer resin particles and the dispersion medium as follows: (1) The difference $\Delta\delta^1$ between the SP value $\delta p^1$ of a homopolymer composed only of at least one monomer component in the copolymer resin and the SP value $\delta s^1$ of the dispersion medium is not smaller than 1.0, preferably not smaller than 1.5;

(2) The difference $\Delta\delta^2$ between the SP value $\delta p^2$ of a homopolymer composed only of at least one other monomer component and the SP value $\delta s^1$ of the dispersion medium is not larger than 1.0, preferably in the range of $0.5 \leq \Delta\delta^2 \leq 1.0$; and (3) The difference $\Delta$ between $\Delta\delta^1$ and $\Delta\delta^2$ ($\Delta\delta^1 - \Delta\delta^2$) is at least 0.5, preferably at least 1.0.

By doing so, it is possible to obtain copolymer resin particles each having a portion insoluble in the solvent, which is defined by the above (1), and a soluble or swellable outer skin portion wrapping the insoluble portion, which is defined by the above (2).

By virtue of the configuration of the copolymer resin particles thus obtained, the portion of each copolymer resin particle which is insoluble in the dispersion medium has no affinity for the dispersion medium, whereas the portion of each copolymer resin particle which is soluble or swellable in the dispersion medium has an affinity for the dispersion medium. Consequently, the copolymer resin particles have a double-layer particle structure in which the insoluble portion constitutes a nuclear portion, and the soluble or swellable portion constitutes an outer skin portion. Thus, it is considered that, as the proportion of the swellable portion increases, the particle diameter increases, whereas, as the proportion of the swellable portion decreases, the particle diameter decreases. It is also considered that, when a component in the copolymer resin is regarded as being soluble, the soluble portion formed from the soluble component does not contribute to the change of the particle diameter, and that the particle diameter depends on the insoluble portion.

DESCRIPTION OF THE PREFERRED EMBODIMENTS

First, the liquid toner as the first object of the present invention will be explained.

With regard to the copolymer resin and the dispersion medium in the liquid toner, there is no particular restriction on the combination of a copolymer resin and a dispersion medium used in the present invention, provided that the copolymer resin and the dispersion medium have the above-described relationship. Examples of copolymer resins usable in the liquid toner are thermoplastic resins such as styrene-butadiene copolymer resin, styrene-isoprene copolymer resin, styrene-acrylonitrile copolymer resin, ethylene-vinyl acetate copolymer resin, ethylene-acrylate copolymer resin, ethylene-acrylic acid copolymer resin, ethylene-methyl acrylate copolymer resin, ethylene-ethyl acrylate copolymer resin, vinyl acetate-methyl methacrylate copolymer resin, acrylic acid-methyl methacrylate copolymer resin, vinyl chloride-vinyl acetate copolymer resin, etc. It is preferable to use a thermoplastic resin whose melt flow rate (MFR) defined by ASTM D-1238 is in the range of from 1 dg/min to 400 dg/min, preferably from 2 dg/min to 150 dg/min. The MFR value range is equivalent to a range of from about 60,000 to about 250,000, preferably from about 75,000 to about 200,000, in terms of weight-average molecular weight.

In each copolymer resin, the ratio of a polymeric unit which is regarded as forming a portion soluble or swellable in the dispersion medium to a polymeric unit which is regarded as forming a portion insoluble in the dispersion medium is preferably set in the range of from 95/5 to 5/95, more preferably from 85/15 to 15/85, by weight ratio.

In the case of copolymer resin particles composed of three or more polymeric units, if the third component gives an SP value similar to that of either component that forms a soluble or insoluble portion in relation to the SP value of the dispersion medium, the third component may be regarded as being equivalent to that component. If the three or more components give different SP values in relation to the SP value of the dispersion medium, it is preferable to select two components which respectively give the largest and smallest differences in relation to the SP value of the dispersion medium. The ratio between the two components should be set in the same way as in the case of a copolymer resin comprising two components as described above.

The dispersion medium used in the present invention is required to have electrically insulating properties. It is possible to use a known dispersion medium having a volume resistivity of not lower than $10^{10}$ ohm-cm. In the present invention, however, a dispersion medium is selected on the basis of the above-described SP value relationship with the copolymer resin used.

For example, when styrene-isoprene copolymer resin particles are used as toner particles, the SP value of polystyrene is 9.1, and the SP value of polyisoprene is 8.15. Accordingly, if n-hexane (SP value: 7.3) is used as a dispersion medium, $\Delta\delta^1$ is 9.1−7.3=1.8, and $\Delta\delta^2$ is 8.15−7.3=0.85. Hence, $\Delta(\Delta\delta^1-\Delta\delta^2)$ is 0.95. Thus, the copolymer resin and the dispersion medium satisfy the above-described relationship. Further, it may be considered that the styrene-isoprene copolymer resin particles have such a configuration in the dispersion medium that a portion which is derived from the isoprene component forms an outer skin portion as a soluble or swellable portion, and a portion which is derived from the styrene component forms an insoluble nuclear portion.

The following are homopolymers and their SP values, which are used as indices in relation to the SP value of the dispersion medium when the above-described copolymer resins are used:

Polyethylene (8.1); polybutadiene (8.4); polyisoprene (8.15); polyisobutylene (7.7); polylauryl methacrylate (8.2); polystearyl methacrylate (8.2); polyisobornyl methacrylate (8.2); poly-t-butyl methacrylate (8.2); polystyrene (9.1); polyethyl methacrylate (9.1); polymethyl methacrylate (9.3); polymethyl acrylate (9.7); polyethyl acrylate (9.2); and polyacrylonitrile (12.8).

Examples of usable dispersion mediums and their SP values are as follows: n-hexane (7.3); n-heptane (7.5); n-octane (7.5); nonane (7.6); decane (7.7); dodecane (7.9); cyclohexane (8.2); perchloroethylene (9.3); and trichloroethane (9.9). It is also possible to use Isopar G, Isopar H, Isopar L, Isopar C, Isopar E, and Isopar M (manufactured by Exxon), which have an SP value in the range of from 7.0 to 7.3.

Examples of combinations of a copolymer resin and a dispersion medium which are preferable to use to produce the liquid toner of the present invention will be shown below.

First, copolymer resins which are preferable to use in combination with n-hexane (SP value: 7.3) when used as a dispersion medium will be shown below, together with the difference $\Delta\delta^1$ between the solubility parameter value $\delta p^1$ of a homopolymer composed only of one monomer component in each copolymer resin and the solubility parameter value $\delta s^1$ of the dispersion medium, the difference $\Delta\delta^2$ between the solubility parameter value $\delta p^2$ of a homopolymer composed only of the other monomer component and the SP value $\delta s^1$ of the dispersion medium, and the difference $\Delta$ between $\Delta\delta^1$ and $\Delta\delta^2$ ($\Delta\delta^1-\Delta\delta^2$). It should be noted that the numerical value in each pair of parentheses shows the solubility parameter value of a homopolymer which consists only of the monomer component concerned.

Ethylene (8.1)—vinyl acetate (9.4) copolymer resin: $\Delta\delta^1$=0.8; $\Delta\delta^2$=2.1; and $\Delta(\Delta\delta^1-\Delta\delta^2)$=1.3

Ethylene (8.1)—methyl acrylate (9.7) copolymer resin: $\Delta\delta^1$=0.8; $\Delta\delta^2$=2.4; and $\Delta(\Delta\delta^1-\Delta\delta^2)$=1.6

Ethylene (8.1)—ethyl acrylate (9.2) copolymer resin: $\Delta\delta^1$=0.8; $\Delta\delta^2$=1.9; and $\Delta(\Delta\delta^1-\Delta\delta^2)$=1.1

Styrene (9.1)—isoprene (8.15) copolymer resin: $\Delta\delta^1$=0.9; $\Delta\delta^2$=1.8; and $\Delta(\Delta\delta^1-\Delta\delta^2)$=0.9

Lauryl methacrylate (8.2)—methyl methacrylate (9.3) copolymer resin: $\Delta\delta^1$=0.9; $\Delta\delta^2$=2.0; and $\Delta(\Delta\delta^1-\Delta\delta^2)$=1.1

Lauryl methacrylate (8.2)—ethyl methacrylate (9.1) copolymer resin: $\Delta\delta^1$=0.9; $\Delta\delta^2$=1.8; and $\Delta(\Delta\delta^1-\Delta\delta^2)$=0.9

Lauryl methacrylate (8.2)—methyl acrylate (9.7) copolymer resin: $\Delta\delta^1$=0.9; $\Delta\delta^2$=2.4; and $\Delta(\Delta\delta^1-\Delta\delta^2)$=1.3

Lauryl methacrylate (8.2)—ethyl acrylate (9.2) copolymer resin: $\Delta\delta^1$=0.9; $\Delta\delta^2$=1.9; and $\Delta(\Delta\delta^1-\Delta\delta^2)$=1.0

Lauryl methacrylate (8.2)—propyl acrylate (9.0) copolymer resin: $\Delta\delta^1$=0.9; $\Delta\delta^2$=1.7; and $\Delta(\Delta\delta^1-\Delta\delta^2)$=0.8

Stearyl methacrylate (8.2)—methyl methacrylate (9.3) copolymer resin: $\Delta\delta^1$=0.9; $\Delta\delta^2$=2.0; and $\Delta(\Delta\delta^1-\Delta\delta^2)$=1.1

Stearyl methacrylate (8.2)—ethyl methacrylate (9.1) copolymer resin: $\Delta\delta^1$=0.9; $\Delta\delta^2$=1.8; and $\Delta(\Delta\delta^1-\Delta\delta^2)$=0.9

Stearyl methacrylate (8.2)—methyl acrylate (9.7) copolymer resin: $\Delta\delta^1$=0.9; $\Delta\delta^2$=2.4; and $\Delta(\Delta\delta^1-\Delta\delta^2)$=1.5

Stearyl methacrylate (8.2)—ethyl acrylate (9.2) copolymer resin: $\Delta\delta^1$=0.9; $\Delta\delta^2$=1.9; and $\Delta(\Delta\delta^1-\Delta\delta^2)$=1.0

Stearyl methacrylate (8.2)—propyl acrylate (9.0) copolymer resin: $\Delta\delta^1$=0.9; $\Delta\delta^2$=1.7; and $\Delta(\Delta\delta^1-\Delta\delta^2)$=0.8

Isobornyl methacrylate (8.2)—methyl methacrylate (9.3) copolymer resin: $\Delta\delta^1$=0.9; $\Delta\delta^2$=2.0; and $\Delta(\Delta\delta^1-\Delta\delta^2)$=1.1

Isobornyl methacrylate (8.2)—ethyl methacrylate (9.1) copolymer resin: $\Delta\delta^1$=0.9; $\Delta\delta^2$=1.8; and $\Delta(\Delta\delta^1-\Delta\delta^2)$=0.9

Isobornyl methacrylate (8.2)—methyl acrylate (9.7) copolymer resin: $\Delta\delta^1$=0.9; $\Delta\delta^2$=2.4; and $\Delta(\Delta\delta^1-\Delta\delta^2)$=1.3

Isobornyl methacrylate (8.2)—ethyl acrylate (9.2) copolymer resin: $\Delta\delta^1$=0.9; $\Delta\delta^2$=1.9; and $\Delta(\Delta\delta^1-\Delta\delta^2)$=1.0

Isobornyl methacrylate (8.2)—propyl acrylate (9.0) copolymer resin: $\Delta\delta^1$=0.9; $\Delta\delta^2$=1.7; and $\Delta(\Delta\delta^1-\Delta\delta^2)$=0.8 t-butyl methacrylate (8.3)—methyl methacrylate (9.3) copolymer resin: $\Delta\delta^1$=1.0; $\Delta\delta^2$=2.0; and $\Delta(\Delta\delta^1-\Delta\delta^2)$=1.0 t-butyl methacrylate (8.3)—ethyl methacrylate (9.1) copolymer resin: $\Delta\delta^1$=1.0; $\Delta\delta^2$=1.8; and $\Delta(\Delta\delta^1-\Delta\delta^2)$=1.0 t-butyl methacrylate (8.3)—methyl acrylate (9.7) copolymer resin: $\Delta\delta^1$=1.0; $\Delta\delta^2$=2.4; and $\Delta(\Delta\delta^1-\Delta\delta^2)$=1.4 t-butyl methacrylate (8.3)—ethyl acrylate (9.2) copolymer resin: $\Delta\delta^1$=1.0; $\Delta\delta^2$=1.9; and $\Delta(\Delta\delta^1-\Delta\delta^2)$=0.9 t-butyl methacrylate (8.3)—propyl acrylate (9.0) copolymer resin: $\Delta\delta^1$=1.0; $\Delta\delta^2$=1.7; and $\Delta(\Delta\delta^1-\Delta\delta^2)$=0.7

As will be clear from the SP values in the abovementioned dispersion mediums, these copolymer resins are usable in combination with n-heptane, n-octane, nonane, decane, dodecane, cyclohexane, etc. in the same way as in the case of n-hexane.

The following is an example of a copolymer resin which is preferable to use in combination with toluene (8.9) when used as a dispersion medium, together with the solubility parameter value differences:

Styrene (9.1)—acrylonitrile (12.8) copolymer resin: $\Delta\delta^1$=0.2; $\Delta\delta^2$=3.9; and $\Delta(\Delta\delta^1-\Delta\delta^2)$=3.7

The following are examples of copolymer resins which are preferable to use in combination with perchloroethylene (9.3) when used as a dispersion medium, together with the solubility parameter value differences:

Ethylene (8.1)—vinyl acetate (9.4) copolymer resin: $\Delta\delta^1$=1.2; $\Delta\delta^2$=0.1; and $\Delta(\Delta\delta^1-\Delta\delta^2)$=1.1

Ethylene (8.1)—methyl acrylate (9.7) copolymer resin: $\Delta\delta^1$=1.2; $\Delta\delta^2$=0.4; and $\Delta(\Delta\delta^1-\Delta\delta^2)$=0.7

Ethylene (8.1)—ethyl acrylate (9.2) copolymer resin: $\Delta\delta^1$=1.2; $\Delta\delta^2$=0.1; and $\Delta(\Delta\delta^1-\Delta\delta^2)$=1.1

Styrene (9.1)—isoprene (8.15) copolymer resin: $\Delta\delta^1$=1.15; $\Delta\delta^2$=0.2; and $\Delta(\Delta\delta^1-\Delta\delta^2)$=0.95

Lauryl methacrylate (8.2)—methyl methacrylate (9.3) copolymer resin: $\Delta\delta^1$=1.1; $\Delta\delta^2$=0; and $\Delta(\Delta\delta^1-\Delta\delta^2)$=1.1

Lauryl methacrylate (8.2)—ethyl methacrylate (9.1) copolymer resin: $\Delta\delta^1$=1.1; $\Delta\delta^2$=0.2; and $\Delta(\Delta\delta^1-\Delta\delta^2)$=0.9

Lauryl methacrylate (8.2)—methyl acrylate (9.7) copolymer resin: $\Delta\delta^1$=1.1; $\Delta\delta^2$=0.4; and $\Delta(\Delta\delta^1-\Delta\delta^2)$=0.7

Lauryl methacrylate (8.2)—ethyl acrylate (9.2) copolymer resin: $\Delta\delta^1$=1.1; $\Delta\delta^2$=0.1; and $\Delta(\Delta\delta^1-\Delta\delta^2)$=1.0

Lauryl methacrylate (8.2)—propyl acrylate (9.0) copolymer resin: $\Delta\delta^1$=1.1; $\Delta\delta^2$=0.3; and $\Delta(\Delta\delta^1-\Delta\delta^2)$=0.8

Stearyl methacrylate (8.2)—methyl methacrylate (9.3) copolymer resin: $\Delta\delta^1$=1.1; $\Delta\delta^2$=0; and $\Delta(\Delta\delta^1-\Delta\delta^2)$=1.1

Stearyl methacrylate (8.2)—ethyl methacrylate (9.1) copolymer resin: $\Delta\delta^1$=1.1; $\Delta\delta^2$=0.2; and $\Delta(\Delta\delta^1-\Delta\delta^2)$=0.9

Stearyl methacrylate (8.2)—methyl methacrylate (9.7) copolymer resin: $\Delta\delta^1$=1.1; $\Delta\delta^2$=0.4; and $\Delta(\Delta\delta^1-\Delta\delta^2)$=0.7

Stearyl methacrylate (8.2)—ethyl acrylate (9.2) copolymer resin: $\Delta\delta^1$=1.1; $\Delta\delta^2$=0.1; and $\Delta(\Delta\delta^1-\Delta\delta^2)$=1.0

Stearyl methacrylate (8.2)—propyl acrylate (9.0) copolymer resin: $\Delta\delta^1$=1.1; $\Delta\delta^2$=0.3; and $\Delta(\Delta\delta^1-\Delta\delta^2)$=0.8

Isobornyl methacrylate (8.2)—methyl methacrylate (9.3) copolymer resin: $\Delta\delta^1$=1.1; $\Delta\delta^2$=0; and $\Delta(\Delta\delta^1-\Delta\delta^2)$=1.1

Isobornyl methacrylate (8.2)—ethyl methacrylate (9.1) copolymer resin: $\Delta\delta^1$=1.1; $\Delta\delta^2$=0.2; and $\Delta(\Delta\delta^1-\Delta\delta^2)$=0.9

Isobornyl methacrylate (8.2)—methyl acrylate (9.7) copolymer resin: $\Delta\delta^1$=1.1; $\Delta\delta^2$=0.4; and $\Delta(\Delta\delta^1-\Delta\delta^2)$=0.7

Isobornyl methacrylate (8.2)—ethyl acrylate (9.2) copolymer resin: $\Delta\delta^1$=1.1; $\Delta\delta^2$=0.1; and $\Delta(\Delta\delta^1-\Delta\delta^2)$=1.0

Isobornyl methacrylate (8.2)—propyl acrylate (9.0) copolymer resin: $\Delta\delta^1$=1.1; $\Delta\delta^2$=0.3; and $\Delta(\Delta\delta^1-\Delta\delta^2)$=0.8 t-butyl methacrylate (8.3)—methyl methacrylate (9.3) copolymer resin: $\Delta\delta^1$=1.0; $\Delta\delta^2$=0; and $\Delta(\Delta\delta^1-\Delta\delta^2)$=1.0 t-butyl methacrylate (8.3)—ethyl methacrylate (9.1) copolymer resin: $\Delta\delta^1$=1.0; $\Delta\delta^2$=0.2; and $\Delta(\Delta\delta^1-\Delta\delta^2)$=0.8 t-butyl methacrylate (8.3)—methyl acrylate (9.7) copolymer resin: $\Delta\delta^1$=1.0; $\Delta\delta^2$=0.4; and $\Delta(\Delta\delta^1-\Delta\delta^2)$=0.6 t-butyl methacrylate (8.3)—ethyl acrylate (9.2) copolymer resin: $\Delta\delta^1$=1.0; $\Delta\delta^2$=0.1; and $\Delta(\Delta\delta^1-\Delta\delta^2)$=0.9 t-butyl methacrylate (8.3)—propyl acrylate (9.0) copolymer resin: $\Delta\delta^1$=1.0; $\Delta\delta^2$=0.3; and $\Delta(\Delta\delta^1-\Delta\delta^2)$=0.7

The following are examples of copolymer resins which are preferable to use in combination with trichloroethane (9.9) when used as a dispersion medium, together with the solubility parameter value differences:

n-propyl methacrylate (8.8)—methyl acrylate (9.7) copolymer resin: $\Delta\delta^1=1.1$; $\Delta\delta^2=0.2$; and $\Delta(\Delta\delta^1-\Delta\delta^2)=0.9$ n-propyl methacrylate (8.8)—methyl methacrylate (9.3) copolymer resin: $\Delta\delta^1=1.1$; $\Delta\delta^2=0.6$; and $\Delta(\Delta\delta^1-\Delta\delta^2)=0.5$ n-butyl methacrylate (8.7)—methyl acrylate (9.7) copolymer resin: $\Delta\delta^1=1.2$; $\Delta\delta^2=0.2$; and $\Delta(\Delta\delta^1-\Delta\delta^2)=1.0$ n-butyl methacrylate (8.7)—ethyl acrylate (9.2) copolymer resin: $\Delta\delta^1=1.2$; $\Delta\delta^2=0.7$; and $\Delta(\Delta\delta^1-\Delta\delta^2)=0.5$ n-butyl methacrylate (8.7)—methyl methacrylate (9.3) copolymer resin: $\Delta\delta^1=1.2$; $\Delta\delta^2=0.6$; and $\Delta(\Delta\delta^1-\Delta\delta^2)=0.6$ n-hexyl methacrylate (8.6)—methyl acrylate (9.7) copolymer resin: $\Delta\delta^1=1.3$; $\Delta\delta^2=0.2$; and $\Delta(\Delta\delta^1-\Delta\delta^2)=1.1$ n-hexyl methacrylate (8.6)—ethyl acrylate (9.2) copolymer resin: $\Delta\delta^1=1.3$; $\Delta\delta^2=0.7$; and $\Delta(\Delta\delta^1-\Delta\delta^2)=0.6$ n-hexyl methacrylate (8.6)—methyl methacrylate (9.3) copolymer resin: $\Delta\delta^1=1.3$; $\Delta\delta^2=0.6$; and $\Delta(\Delta\delta^1-\Delta\delta^2)=0.7$ n-hexyl methacrylate (8.6)—ethyl methacrylate (9.1) copolymer resin: $\Delta\delta^1=1.3$; $\Delta\delta^2=0.8$; and $\Delta(\Delta\delta^1-\Delta\delta^2)=0.5$ Regarding the diameter of the copolymer resin particles in the liquid toner, it is preferable that the particle diameter should be properly adjusted in the range of from 0.1 μm to 100 μm in general. The content of copolymer resin particles in the liquid toner is preferably in the range of from 0.01% to 80%, more preferably from 0.1% to 50%, by weight.

The copolymer resin particles are each present in the liquid toner in such a state that a portion thereof which is insoluble in the dispersion medium constitutes a nucleus, and a portion thereof which has an affinity for the dispersion medium constitutes an outer skin portion. By virtue of the surface affinity for the dispersion medium, gelation, aggregation or precipitation will not occur even if the particle concentration is increased. Thus, a liquid toner having excellent dispersion stability can be obtained.

Further, the copolymer resin particles in the liquid toner may contain a pigment. Known organic or inorganic coloring agents can be used as pigments in the present invention. Examples of usable black coloring agents are carbon black and triiron tetraoxide as inorganic coloring agents, and cyanine black as an organic coloring agent.

Examples of yellow coloring agents are such inorganic coloring agents as chrome yellow, cadmium yellow, yellow iron oxide, titanium yellow, ocher, etc. Examples of acetoacetic arylide monoazo pigments of slightly soluble metal salts (azo lakes) are Hansa Yellow G (C.I. No. Pigment Yellow 1; the same shall apply hereinafter), Hansa Yellow 10G (Pigment Yellow 3), Hansa Yellow RN (Pigment Yellow 65), Hansa Brilliant Yellow 5GX (Pigment Yellow 74), Hansa Brilliant Yellow 10GX (Pigment Yellow 98), Permanent Yellow FGL (Pigment Yellow 97), Symuler Lake Fast Yellow 6G (Pigment Yellow 133), and Lionol Yellow K-2R (Pigment Yellow 169). Examples of acetoacetic arylide disazo pigments are Disazo Yellow G (Pigment Yellow 12), Disazo Yellow GR (Pigment Yellow 13), Disazo Yellow 5G (Pigment Yellow 14), Disazo Yellow 8G (Pigment Yellow 17), Disazo Yellow R (Pigment Yellow 55), and Permanent Yellow HR (Pigment Yellow 83). Examples of condensation azo pigments are Cromophtal Yellow 3G (Pigment Yellow 93), Cromophtal Yellow 6G (Pigment Yellow 94), and Cromophtal Yellow GR (Pigment Yellow 95). Examples of benzimidazolone monoazo pigments are Hostaperm Yellow H3G (Pigment Yellow 154), Hostaperm Yellow H4G (Pigment Yellow 151), Hostaperm Yellow H2G (Pigment Yellow 120), Hostaperm Yellow H6G (Pigment Yellow 175), and Hostaperm Yellow HLR (Pigment Yellow 156). Examples of isoindolinone pigments are Irgazin Yellow 3RLTN (Pigment Yellow 110), Irgazin Yellow 2RLT, Irgazin Yellow 2GLT (Pigment Yellow 109), Fastogen Super Yellow GROH (Pigment Yellow 137), Fastogen Super Yellow GRO (Pigment Yellow 110), and Sandorin Yellow 6GL (Pigment Yellow 173). Examples of other yellow coloring agents include threne pigments, i.e. flavanthrone (Pigment Yellow 24), Anthrapyrimidine (Pigment Yellow 108), phthaloylamide anthraquinone (Pigment Yellow 123), and Hello Fast Yellow E3R (Pigment Yellow 99), metal complex pigments, i.e. azo nickel complex pigment (Pigment Yellow 10), nitroso nickel complex pigment (Pigment Yellow 153), and azomethine copper complex pigment (Pigment Yellow 117), and quinophthalone pigments, i.e. phthalimide quinophthalone pigment (Pigment Yellow 138), etc.

Examples of magenta coloring agents usable in the present invention are such inorganic coloring agents as cadmium red, iron oxide red, silver red, red lead, and antimony red. Examples of azo lakes of azo pigments are Brilliant Carmine 6B (Pigment Red 57:1), Lake Red (Pigment Red 53:1), Permanent Red F5R (Pigment Red 48), Lithol Red (Pigment Red 49), Persian Orange (Pigment Orange 17), Croceine Orange (Pigment Orange 18), Helio Orange TD (Pigment Orange 19), Pigment Scarlet (Pigment Red 60:1), Brilliant Scarlet G (Pigment 64:1), Helio Red RMT (Pigment Red 51), Bordeaux 10B (Pigment Red 63), and Hello Bordeaux BL (Pigment Red 54). Examples of insoluble azo (monoazo, disazo, and condensation azo) pigments are Para Red (Pigment Red 1), Lak.e. Red 4R (Pigment Red 3), Permanent Orange (Pigment Orange 5), Permanent Red FR2 (Pigment Red 2), Permanent Red FRLL (Pigment Red 9), Permanent Red FGR (Pigment Red 112), Brilliant Carmine BS (Pigment Red 114), Permanent Carmine FB (Pigment Red 5), P.V. Carmine HR (Pigment Red 150), Permanent Carmine FBB (Pigment Red 146), Novoperm Red F3RK-F5RK (Pigment Red 170), Novoperm Red HFG (Pigment Orange 38), Novoperm Red HF4B (Pigment Red 187), Novoperm Orange HL. HL-70 (Pigment Orange 36), P.V. Carmine HF4C (Pigment Red 185), Hostaperm Brown HFR (Pigment. Brown 25), Vulcan Orange (Pigment Orange 16), Pyrazolone Orange (Pigment Orange 13), and Pyrazolone Red (Pigment Red 38). Examples of condensation azo pigments are Cromophtal Orange 4R (Pigment Orange 31), Cromophtal Scarlet R (Pigment Red 166), and Cromophtal Red BR (Pigment Red 144).

Examples of condensation polycyclic pigments are anthraquinone pigments, i.e. Pyranthrone Orange (Pigment Orange 40), Anthanthrone Orange (Pigment Orange 168), and Dianthraquinonyl Red (Pigment Red 177), thioindigo pigments, i.e. Thioindigo Magenta (Pigment Violet 38), Thioindigo Violet (Pigment Violet 36), and Thioindigo Red (Pigment Red 88), perinone pigments, i.e. Perinone Orange (Pigment Orange 43), perylene pigments, i.e. Perylene Red (Pigment Red 190), Perylene Vermilion (Pigment Red 123), Perylene Maroon (Pigment Red 179), Perylene Scarlet (Pigment Red 149), and Perylene Red (Pigment RED 179), quinacridone pigments, i.e. Quinacridone Red (Pigment Violet 19), Quinacridoneo Magenta (Pigment Red 122), Quinacridone Maroon (Pigment Red 206), and Quinacridone Scarlet (Pigment Red 207). Examples of other condensation polycyclic pigments are pyrrocoline pigments, in-mold decorating lake pigments (water-soluble dye+precipitant→lake formation), i.c. Rhodamine 6G Lake (Pigment Red 81).

Examples of cyan coloring agents usable in the present invention are such inorganic coloring agents as ultramarine blue, iron blue, cobalt blue, cerulean blue, etc. Examples of phthalocyanine pigments are Fastogen Blue BB (Pigment Blue 15), Sumitone Cyanine Blue HB (Pigment Blue 15), Cyanine Blue 5020 (Pigment Blue 15:1), Monastral Blue FBR (Pigment Blue 15:2), Palomar Blue B-4810 (Pigment Blue 15:3), Monastral Blue FGX (Pigment Blue 15:4), Lionol Blue ES (Pigment Blue 15:6), Heliogen Blue L6700F (Pigment Blue 15:6), Sumika Print Cyanine Blue GN-0 (Pigment Blue 15), Heliogen Blue L7560 (Pigment Blue 16), Fast Sky Blue A-612 (Pigment Blue 17), Cyanine Green GB (Pigment Green 7), Cyanine Green S537-2Y (Pigment Green 36), and Sumitone Fast Violet RL (Pigment Violet 23). Examples of other cyan coloring agents include Indanthrone Blue (PB-60P, PB-22, PB-21, PB-64), which are threne pigments, and Methyl Violet Phosphomolybdate Lake (PV-3), which is a basic dye lake pigment.

It is also possible to use coloring agents known as "modified pigments" which are formed by coating a resin material on the surfaces of the above-mentioned coloring agents.

Regarding the particle diameter of a pigment contained in the copolymer resin particles, it is possible to use pigment particles having an average particle diameter in the range of from 0.1 μm to 100 μm in the state of secondary aggregation. Pigment particles can be contained in the copolymer resin particles in an amount of up to 80% by weight, preferably not higher than 75% by weight. In the liquid toner of the present invention, the content of copolymer resin particles can be increased without causing problems such as aggregation in contrast to the conventional liquid toners, as described above. Therefore, the pigment content can be markedly increased.

Further, a polymer dispersant, e.g. polyhydroxy-carboxylic acid ester, and a charge control agent may be added to the liquid toner of the present invention. Since the copolymer resin used in the present invention per se has an excellent affinity for the dispersion medium, it is not always necessary to add a dispersant to the liquid toner. However, if the granulation step (described later) is carried out in the presence of a dispersant, the dispersibility in the good solvent can be improved, and entanglement of molecular chains can be effectively controlled during granulation. Therefore, the toner particle diameter can be further reduced. That is, it is possible to obtain a particle size of the order of submicrons and to narrow the particle size distribution.

Polymer dispersants, e.g. polyhydroxycarboxylic acid esters, can be used as a dispersant in the present invention. oPolyhydroxycarboxylic acid esters are polymers of ester derivatives of a hydroxycarboxylic acid HO-X-COOH, where X is a bivalent saturated or unsaturated aliphatic hydrocarbon containing at least 12 carbon atoms. Further, at least 4 carbon atoms are present between the hydroxyl group and the carboxyl group. Preferable examples of such hydroxycarboxylic acid derivatives are hydroxycarboxylic acid alkyl esters, i.e. 12-hydroxystearic acid methyl ester, 12-hydroxystearic acid ethyl ester, etc., metal salts of hydroxycarboxylic acids, i.e. 12-lithium hydroxycarboxylate, 12-aluminum hydroxycarboxylate, etc., hydroxycarboxylic acid amide, hardened castor oil, and so forth.

Polyhydroxycarboxylic acid esters include various forms: one which is obtained by polymerization in which a hydroxycarboxylic acid ester is partially saponified in the presence of a small amount of an amine or a catalyst; another which is obtained by esterification between molecules; and another which is obtained by esterification in molecules.

Preferable polyhydroxycarboxylic acid esters are condensation products of from three to ten hydroxycarboxylic acid ester molecules, which are light-gray brown wax-like substances. A polyhydroxycarboxylic acid ester having a polymerization degree which is smaller than 3 or larger 10 is not compatible with a dispersion medium such as n-hexane. Therefore, such a polyhydroxycarboxylic acid ester provides no effect as is expected from a dispersant. There is no specific restriction on the amount of polyhydroxycarboxylic acid ester to be added to the liquid toner of the present invention. However, the polyhydroxycarboxylic acid ester may be used in an amount of from 0.01% to 200% by weight of the weight of the resin. The polyhydroxycarboxylic acid ester may be added in any production step before the granulation step.

Preferable examples of charge control agents usable in the present invention are metal salts of dialkylsulfosuccinic acid, i.e. dialkylcobalt sulfosuccinate, dialkylmanganese sulfosuccinate, dialkylzirconium sulfosuccinate, dialkylytrium sulfosuccinate, dialkylnickel sulfosuccinate, etc., metallic soaps, i.e. manganese naphthenate, calcium naphthenate, zirconium naphthenate, cobalt naphthenate, iron naphthenate, lead naphthenate, nickel naphthenate, chromium naphthenate, zinc naphthenate, magnesium naphthenate, manganese octylate, calcium octylate, zirconium octylate, iron octylate, lead octylate, cobalt octylate, chromium octylate, zinc octylate, magnesium octylate, manganese dodecylate, calcium dodecylate, zirconium dodecylate, iron dodecylate, lead dodecylate, cobalt dodecylate, chromium dodecylate, zinc dodecylate, magnesium dodecylate, etc., metal salts of alkylbenzenesulfonic acid, i.e. calcium dodecylbenzenesulfonate, sodium dodecylbenzenesulfonate, barium dodecylbenzenesulfonate, etc., phospholipids, i.e. lecithin, cephalin, etc., and organic amines, i.e. n-decyl amine. It is only necessary to add the minimum required amount of such a charge control agent to produce the charge control effoect. In general, however, the charge control agent is preferably added so that the content thereof in the liquid toner is in the range of from 0.01% to 50% by weight. The charge control agent may be added during the production process (described later) or to the liquid toner after the removal of the solvent. In either case, the desired charge control effect can be manifested. It is, however, preferable to add the charge control agent during the production process before the granulation step.

As a fixing agent, various kinds of resin which are soluble in a dispersion medium, e.g. n-hexane, may be added. Examples of fixing agents usable in the present invention are modified or unmodified alkyd resins, ordinary acrylic resins, synthetic rubbers, polyalkylene oxides, polyvinyl acetals (including butyral), vinyl acetate resins, etc.

Next, the liquid toner producing method of the present invention will be explained.

The liquid toner producing method of the present invention includes the steps of:

(1) dissolving a copolymer resin in a solvent to prepare a copolymer resin solution;

(2) mixing the copolymer resin solution with a dispersion medium in the presence or absence of a pigment to carry out granulation for forming copolymer resin particles; and (3) removing the solvent from the solution.

First, the solvent that is used in the step (1) is preferably a solvent which can dissolve the copolymer resin at room temperature (25° C.), and which has an SP value which is similar to both the SP value $\delta p^1$ of a homopolymer composed only of at least one monomer component and the SP value SP value $\delta p^2$ of a homopolymer composed only of at least one other monomer component. In the case of styrene-isoprene copolymer resin, for example, the SP value of polystyrene is 9.1, and the SP value of polyisoprene is 8.15. Therefore, it can be dissolved in a solvent, e.g., toluene (8.9), cyclohexane (8.2), etc. In this case, the copolymer resin may fail to dissolve or swell in the solvent according to the chemical composition thereof. Howe. ver, if the condition of dispersion of monomolecular chains is favorable, it will be good even if the copolymer resin is in an insoluble state.

The following are examples of solvents (SP value) usable in the present invention by being properly selected on the basis of the SP value relationship:

Cyclohexane (8.2), cellosolve acetate (9.4), toluene (8.9), tetrahydrofuran (9.1), methyl ethyl ketone (9.5), cyclohexanone (10.4), acetone (9.6), dioxane (10.1), ethyl cellosolve (10.7), cyclohexanol (11.4), methyl cellosolve (11.7), isopropyl alcohol (11.4), ethanol (12.8), and methanol (14.5).

If a dispersant is added to the solution in an amount in the range of from 0.3% to 0.5% by weight, a favorable resin dispersion condition can be obtained. The copolymer resin may be dissolved in the solvent in desired proportions. However, if the resin ratio is excessively high, resin particles contact each other and are likely to gel in the precipitation process. Therefore, it is preferable to dissolve the copolymer resin in an amount in the range of from 1% to 80%, more preferably from 5% to 10%, by weight, to thereby prepare a dilute solution.

Next, in the granulation step (2), the solution prepared in the step (1) is mixed with a dispersion medium having the following relationship with the copolymer resin. That is, the copolymer resin and the dispersion medium have the relationship that the difference $\Delta\delta^1$ between the solubility parameter value $\delta p^1$ of a homopolymer composed only of at least one monomer component in the copolymer resin and the solubility parameter value of the dispersion medium is not smaller than 1.0, and that the difference $\Delta\delta^2$ between the solubility parameter value $\delta p^2$ of a homopolymer composed only of at least one other monomer component and the solubility parameter value of the dispersion medium is not larger than 1.0, and further that the difference A between $\Delta\delta^1$ and $\Delta\delta^2$ ($\Delta\delta^1-\Delta\delta^2$) is at least 0.5. A solvent which satisfies the above-described relationship should be selected and used as a dispersion medium.

In the case of the cyclohexane solution of styrene-isoprene copolymer resin, for example, the solution is preferably added to, for example, n-hexane (SP value: 7.3). That is, $\Delta\delta^1$ is 9.1−7.3=1.8; $\Delta\delta^2$ is 8.15−7.3=0.85; and $\Delta(\Delta\delta^1-\Delta\delta^2)$ is 0.95. Accordingly, n-hexane satisfies the above-described relationship, and is a suitable dispersion medium in this case. When the cyclohexane solution of styrene-isoprene copolymer resin is added to n-hexane, precipitation of resin particles is clearly observed.

If necessary, a pigment is added to the resin solution or the dispersion medium at this stage, thereby granulating the resin in the presence of the pigment. By doing so, it is possible to form copolymer resin particles containing the pigment. Since the solution is added to the dispersion medium, which is a poor solvent, the resin molecular chains dispersed in the solution are entangled with each other in such a manner as to wrap the pigment therein, and in this way, copolymer resin particles are formed. The resin particle surface that wraps the pigment therein constitutes a soluble or swellable portion of the copolymer resin. Accordingly, even if the copolymer resin contains a pigment, there is no contact between pigment particles, and the dispersion stability can be improved. The diameter of resin particles obtained in this way is in the range of from 0.1 μm to 100 μm.

It is preferable from the viewpoint of granulation that the solvent used to prepare the resin solution should be removed by decantation, evaporation, etc. To adjust the resin particle diameter, the resin particles may be further finely divided by using a ball mill, an attriter, a sand grinder, a Kady mill, a three-roll mill, etc.

When the liquid toner of the present invention is used for electrophotography, the developed image is transferred to an insulating transfer object such as paper by an ordinary transfer method, i.e., electric field transfer, e.g., corona transfer, as a matter of course. It is also possible to.efficiently transfer the developed image to an electrically conductive transfer object such as a metal from the surface of a photosensitive member for electrophotography by pressure transfer method.

The liquid toner of the present invention will be explained below more specifically by way of examples. It should be noted that, in the examples, the term "parts" means parts by weight, and "%" means per cent by weight.

EXAMPLE 1

A composition was formed by mixing together following: Lauryl methacrylate-methyl methacrylate copolymer resin [lauryl methacrylate/methyl methacrylate (weight ratio)=90/10; weight-average molecular weight: 141,000] . . . 1 part Monastral Blue FGX (average particle diameter: 0.15 μm) . . . 1 part Lecithin . . . 1 part 15 g of the composition was cast into 50 g of tetrahydrofuran, and then dispersed therein at room temperature by using an ultrasonic homogenizer, thereby dissolving the copolymer resin in the solvent. Thereafter, the resulting solution was added to 400 g of n-hexane at room temperature with the ultrasonic homogenizer being irradiated. Next, the tetrahydrofuran was removed by using an evaporator, thereby obtaining a liquid toner (A) containing copolymer resin particles dispersed therein.

The particle size distribution and particle diameter ($D_{50}$ value) of the copolymer resin particles thus obtained were measured by using Microtrac-IISRA, manufactured by Nikkiso. The results of the measurement are shown in Table 1 below.

The above-described procedure was repeated in the same way with the above copolymer resin replaced by lauryl methacrylate-methyl methacrylate [lauryl methacrylate/methyl methacrylate (weight ratio)=30/70; weight-average molecular weight: 145,000], thereby obtaining a liquid toner (B). The particle size distribution and particle diameter ($D_{50}$ value) of the copolymer resin particles thus obtained were measured in the same way as the above. The results of the measurement are also shown in Table 1 below.

As to the particle size distribution, in the case of the liquid toner (A), the normal distribution was observed between 0.17 μm and 5.27 μm. In the case of the liquid toner (B), the normal distribution was observed between 1.01 μm and 42.21 μm.

Even after the liquid toners (A) and (B) had been allowed to stand for 6 months, no aggregation of particles was observed. Thus, the liquid toners (A) and (B) had excellent dispersion stability.

TABLE 1

| Liquid toner | Methyl methacrylate content (%) | Particle diameter ($D_{50}$ value, μm) |
|---|---|---|
| (A) | 10 | 1.69 |
| (B) | 70 | 19.9 |

The SP value relationship between the dispersion medium and the copolymer resin is as follows: n-hexane (7.3), and lauryl methacrylate (8.2)—methyl methacrylate (9.3) copolymer resin. Moreover, the weight-average molecular weights of the copolymer resins in the liquid toners (A) and (B) are approximately the same. In view of these facts, the difference in particle diameter between the liquid toners (A) and (B) may be considered to be derived from the methyl methacrylate component, which constitutes the insoluble portion in the dispersion medium.

EXAMPLE 2

A composition was formed by mixing together the following: Vinyltoluene-2-ethylhexyl acrylate copolymer resin [vinyltoluene/2-ethylhexyl acrylate (weight ratio)=50/50; weight-average molecular weight: 94,900]... 1 part Monastral Blue FGX (average particle diameter: 0.15 μm) ... 1 part Lecithin . . . 1 part 15 g of the composition was cast into 50 g of tetrahydrofuran, and then dispersed therein at room temperature by using an ultrasonic homogenizer, thereby dissolving the copolymer resin in the solvent. Thereafter, the resulting solution was added to 400 g of n-octane at room temperature with the ultrasonic homogenizer being irradiated. Next, the tetrahydrofuran was removed by using an evaporator, thereby obtaining a liquid toner (C) containing copolymer resin particles dispersed therein.

The particle size distribution and particle diameter ($D_{50}$ value) of the copolymer resin particles thus obtained were measured by using Microtrac-IISRA, manufactured by Nikkiso. The results of the measurement are shown in Table 2 below.

The above-described procedure was repeated in the same way with the above copolymer resin replaced by vinyltoluene-2-ethylhexyl acrylate copolymer resin [vinyltoluene/2-ethylhexyl acrylate (weight ratio)=80/20; weight-average molecular weight: 114,000], thereby obtaining a liquid toner (D). The particle size distribution and particle diameter ($D_{50}$ value) of the copolymer resin particles thus obtained were measured in the same way as the above. The results of the measurement are also shown in Table 2 below.

As to the particle size distribution, in the case of the liquid toner (C), the normal distribution was observed between 0.17 μm and 5.27 μm. In the case of the liquid toner (D), the normal distribution was observed between 0.34 μm and 5.27 μm.

Even after the liquid toners (C) and (D) had been allowed to stand for 6 months, no aggregation of particles was observed. Thus, the liquid toners (C) and (D) had excellent dispersion stability.

TABLE 2

| Liquid toner | Vinyltoluene content (%) | Particle diameter ($D_{50}$ value, μm) |
|---|---|---|
| (C) | 50 | 0.84 |
| (D) | 80 | 2.34 |

The SP value relationship between the dispersion medium and the copolymer resin is as follows: n-octane (7.5), and vinyltoluene (polyvinyltoluene; SP value: 9.4) -2-ethylhexyl acrylate (poly-2-ethylhexyl acrylate; SP value: 8.5) copolymer resin. Moreover, the weight-average molecular weights of the copolymer resins in the liquid toners (C) and (D) are not very different from each other. In view of these facts, the difference in particle diameter between the liquid toners (C) and (D) may be considered to be derived from the vinyltoluene component, which constitutes the insoluble portion in the dispersion medium.

EXAMPLE 3

A composition was formed by mixing together the following: Styrene-isoprene copolymer resin [Cariflex TR1107P, manufactured by Shell Japan; styrene/isoprene (weight ratio)=14/86; MFR=9 dg/min]. . . 1 part Disazo Yellow 8G (Pigment Yellow 17; average particle diameter: 0.3 μm) . . . 1 part Zirconium naphthenate . . . 1 part 15 g of the composition was cast into 50 g of cyclohexane and then dispersed therein at room temperature by using an ultrasonic homogenizer, thereby dissolving the copolymer resin in the solvent. Thereafter, the resulting solution was added to 400 g of n-hexane at room temperature with the ultrasonic homogenizer being irradiated. Next, the cyclohexane was removed by using an evaporator, thereby obtaining a liquid toner (E) containing copolymer resin particles dispersed therein.

The particle size distribution and particle diameter ($D_{50}$ value) of the copolymer resin particles thus obtained were measured by using Microtrac-IISRA, manufactured by Nikkiso. The results of the measurement are shown in Table 3 below.

The above-described procedure was repeated in the same way with the styrene-isoprene copolymer resin replaced by Kraton D1112 [styrene/isoprene (weight ratio)=14/86; manufactured by Shell Japan; MFR=23 dg/min], thereby obtaining a liquid toner (F). The particle size distribution and particle diameter ($D_{50}$ value) of the copolymer resin particles thus obtained were measured in the same way as the above. The results of the measurement are also shown in Table 3 below.

Further, the above-described procedure was repeated in the same way with the styrene-isoprene copolymer resin replaced by Kraton Dllll [styrene/isoprene (weight ratio)= 21/79; manufactured by Shell Japan; MFR=3 dg/min], thereby obtaining a liquid toner (G). The particle size distribution and particle diameter ($D_{50}$ value) of the copolymer resin particles thus obtained were measured in the same way as the above. The results of the measurement are also shown in Table 3 below.

In the case of the liquid toner (E), the normal distribution was observed between 0.17 μm and 5.29 μm; in the case of the liquid toner (F), the normal distribution was observed between 0.17 μm and 3.73 μm; and in the case of the liquid toner (G), the normal distribution was observed between 0.17 μm and 10.55 μm.

Even after the liquid toners (E) to (G) had been allowed to stand for 6 months, no aggregation of particles was observed. Thus, the liquid toners (E) to (G) had excellent dispersion stability.

TABLE 3

| Liquid toner | Styrene content (%) | Particle diameter ($D_{50}$ value, μm) |
|---|---|---|
| (E) | 14 | 0.97 |
| (F) | 14 | 0.77 |
| (G) | 21 | 3.06 |

The SP value relationship between the dispersion medium and the copolymer resin is as follows: n-hexane (7.3), and styrene (9.1)—isoprene (8.15) copolymer resin. The copolymer resins in the liquid toners (E) and (F) have the same monomer compositional ratio but differ in the MFR value from each o.ther. However, since the MFR value is inversely proportional to the size of the weight-average molecular weight, the liquid toner (E) has a larger copolymer resin particle diameter than that of the liquid toner (F).

In the liquid toner (G), the proportion of the insoluble portion composed of styrene is higher than in the liquid toners (E) and (F). Thus, it will be understood that, in the dispersion medium, the portion of each copolymer resin particle that is formed from the isoprene component does not substantially contribute to the increase of the particle diameter, and that, as the styrene component that forms the insoluble portion increases, the diameter of the resulting particles increases.

EXAMPLE 4

A composition was formed by mixing together the following: Vinyltoluene-2-ethylhexyl methacrylate copolymer resin [Pliolite VT-Ac (vinyltoluene/2-ethylhexyl methacrylate (weight ratio)=80/20; weight-average molecular weight: 194,000), manufactured by Goodyear]. . . 1 part Disazo Yellow 8G (Pigment yellow 17; average particle diameter: 0.3 μm) . . . 1 part Zirconium naphthenate . . . 1 part 15 g of the composition was cast into 50 g of tetrahydrofuran, and then dispersed therein at room temperature by using an ultrasonic homogenizer, thereby dissolving the copolymer resin in the solvent. Thereafter, the resulting solution was added to 400 g of n-hexane at room temperature with the ultrasonic homogenizer being irradiated. Next, the tetrahydrofuran was removed by using an evaporator, thereby obtaining a liquid toner (H) containing copolymer resin particles dispersed therein.

The particle size distribution and particle diameter ($D_{50}$ value) of the copolymer resin particles thus obtained were measured by using Microtrac-IISRA, manufactured by Nikkiso. The results of the measurement are shown in Table 4 below.

The above-described procedure was repeated in the same way with the vinyltoluene-2-ethylhexyl methacrylate copolymer resin replaced by Pliolite VT-Ac [vinyltoluene/2-ethylhexyl methacrylate (weight ratio)=80/20; weightaverage molecular weight: 83,000], manufactured by Goodyear], thereby obtaining a liquid toner (I). The particle size distribution and particle diameter ($D_{50}$ value) of the copolymer resin particles thus obtained were measured in the same way as the above. The results of the measurement are also shown in Table 4 below.

As to the particle size distribution, in the case of the liquid toner (H), the normal distribution was observed between 1.01 μm and 29.85 μm. In the case of the liquid toner (I) , the normal distribution was observed between 0.66 μm and 14.92 μm.

Even after the liquid toners (H) and (I) had been allowed to stand for 6 months, no aggregation of particles was observed. Thus, the liquid toners (H) and (I) had excellent dispersion stability.

TABLE 4

| Liquid toner | Weight-average molecular weight | Particle diameter ($D_{50}$ value, μm) |
|---|---|---|
| (H) | 194,000 | 8.18 |
| (I) | 83,000 | 5.50 |

It may be considered that, since the SP value of the dispersion medium, i.e. n-hexane, is 7.3, vinyltoluene-2-ethylhexyl methacrylate copolymer resin particles have such a configuration in the dispersion medium that a portion derived from the vinyltoluene component (SP value of polyvinyltoluene: 9.4) forms an insoluble portion, and a portion derived from the 2-ethylhexyl methacrylate component (SP value of poly-2-ethylhexyl methacrylate: 8.4) forms a soluble or swellable portion.

Further, the copolymer resin particles in the liquid toners (H) and (I) have the same ratio of copolymer components constituting vinyltoluene/2-ethylhexyl methacrylate. Therefore, it will also be understood that, as the weight-average molecular weight increases, the particle diameter increases.

EXAMPLE 5

A composition was formed by mixing together the following: Lauryl methacrylate-methyl methacrylate copolymer resin [lauryl methacrylate/methyl methacrylate (weight ratio)=90/10; weight-average molecular weight: 141,000]. . . 1 part Monastral Blue FGX (average particle diameter: 0.15 μm) . . . 1 part Lecithin . . . 1 part 15 g of the composition was cast into 50 g of tetrahydrofuran, and then dispersed therein at room temperature by using an ultrasonic homogenizer, thereby dissolving the copolymer resin in the solvent. Thereafter, the resulting solution was added to 400 g of Isopar G (manufactured by Exxon) at room temperature with the ultrasonic homogenizer being irradiated. Next, the tetrahydrofuran was removed by using an evaporator, thereby obtaining a liquid toner containing copolymer resin particles dispersed therein.

The particle size distribution and particle diameter ($D_{50}$ value) of the copolymer resin particles thus obtained were measured by using Microtrac-IISRA, manufactured by Nikkiso. The particle size distribution in the liquid toner showed a normal distribution between 0.17 μm and 5.27 μm. The particle diameter ($D_{50}$value; μm) was 1.57.

The above-described procedure was repeated in the same way with the Isopar G (Exxon) replaced by Isopar L (Exxon), thereby obtaining a liquid toner.

The particle size distribution and particle diameter ($D_{50}$ value) of the copolymer resin particles thus obtained were measured in the same way as the above. The particle size distribution in the liquid toner showed a normal distribution between 0.17 μm and 5.27 μm. The particle diameter ($D_{50}$ value; μm) was 1.41.

Even after these liquid toners had been allowed to stand for 6 months, no aggregation of particles was observed. Thus, the liquid toners had excellent dispersion stability.

The SP value of Isopar G is 7.2, and the SP value of the Isopar L is 7.3. Therefore, it may be considered that the copolymer resin particles had such a configuration in the dispersion medium that a portion derived from the methyl methacrylate component (SP value of polymethyl methacrylate:9.3) forms an insoluble portion, and a portion derived from the lauryl methacrylate component (SP value of polylauryl methacrylate:8.2) forms a soluble or swellable portion.

Next, the ink composition of the present invention, which is the second object of the present invention, will be explained.

With regard to the copolymer resin particles and the dispersion medium in the ink composition, there is no particular restriction on the combination of a copolymer resin and a dispersion medium used in the present invention, provided that the copolymer resin and the dispersion medium have the above-described relationship in terms of the SP value. Examples of copolymer resins usable in the ink composition are thermoplastic resins such as ethylene-vinyl acetate copolymer resin, ethylene-acrylate copolymer resin, ethylene-acrylic acid copolymer resin, ethylene-methyl acrylate copolymer resin, ethylene-ethyl acrylate copolymer resin, vinyl acetate-methyl methacrylate copolymer resin, acrylic acid-methyl methacrylate copolymer resin, vinyl chloride-vinyl acetate copolymer resin, styrene-butadiene copolymer resin, styrene-isoprene copolymer resin, styrene-acrylonitrile copolymer resin, etc. It is preferable to use a thermoplastic resin whose melt flow rate (MFR) is in the range of from 1 dg/min to 400 dg/min, preferably from 2 dg/min to 150 dg/min.

In each copolymer resin, the ratio of a polymeric unit which is regarded as forming a portion soluble or swellable in the dispersion medium to a polymeric unit which is regarded as forming a portion insoluble in the dispersion medium is preferably set in the range of from 95/5 to 5/95, more preferably from 85/15 to 15/85, by weight ratio. If the polymeric unit ratio does not fall within the above range, the homopolymeric nature is undesirably enhanced, so that it becomes impossible to obtain a resin particle structure characteristic of copolymer resin particles, in which each particle consists of a portion which is soluble or swellable in the dispersion medium, and a portion which is insoluble in the dispersion medium In the case of copolymer resin particles composed of three or more polymeric units, if the third component gives an SP value similar to that of either component that forms a soluble or insoluble portion in relation to the SP value of the dispersion medium, the third component may be regarded as being equivalent to that component. If the three or more components give different SP values in relation to the SP value of the dispersion medium, it is preferable to select two components which respectively give the largest and smallest differences in relation to the SP value of the dispersion medium. The ratio between the two components should be set in the same way as in the case of a copolymer resin comprising two components as described above.

A dispersion medium in which such copolymer resin particles are to be dispersed is selected on the basis of the above-described SP value relationship with the copolymer resin used. For example, when ethylene-vinyl acetate copolymer resin is used as a copolymer resin, the SP value of polyethylene is 8.1, and the SP value of polyvinyl acetate is 9.4. Accordingly, if n-hexane (SP value: 7.3) is used as a dispersion medium, $\Delta\delta^1$ is 9.4−7.3=2.1, and $\Delta\delta^2$ is 8.1−7.3=0.8. Hence, $\Delta(\Delta\delta^1-\Delta\delta^2)$ is 2.5. Thus, the copolymer resin and the dispersion medium satisfy the above-described relationship, and are a suitable combination for the ink composition of the present invention. Further, the ethylene-vinyl acetate copolymer resin particles have such a configuration in the dispersion medium that a portion which is derived from the ethylene component forms an outer skin portion as a soluble or swellable portion, and a portion which is derived from the vinyl acetate component forms an insoluble nuclear portion.

The following are homopolymers and their SP values, which are used as indices in relation to the SP value of the dispersion medium when the above-mentioned copolymer resins are used:

Polyethylene (8.1); polybutadiene (8.4); polyisoprene (8.15); polyisobutylene (7.7); polylauryl methacrylate (8.2); polystearyl methacrylate (8.2); polyisobornyl methacrylate (8.2); poly-t-butyl methacrylate (8.2); polystyrene (9.1); polyethyl methacrylate (9.1); polymethyl methacrylate (9.3); polymethyl acrylate (9.7); polyethyl acrylate (9.2); and polyacrylonitrile (12.8).

Examples of usable dispersion mediums and their SP values are as follows: n-hexane (7.3); n-octane (7.5); cyclohexane (8.2); cellosolve acetate (9.4); toluene (8.9); tetrahydrofuran (9.1); methyl ethyl ketone (9.5); cyclohexanone (10.4); acetone (9.6); dioxane (10.1); ethyl cellulose (10.7); cyclohexanol (11.4); methyl cellosolve (11.7); isopropyl alcohol (11.4); ethanol (12.8), and methanol (14.5).

In addition, solvents which are usually used as solvents for inks, may be properly used by taking their SP values into consideration. Examples of such solvents are n-heptane (7.5), rubber solvent, mineral spirit, high-boiling petroleum solvent, xylene (8.8), solvent naphtha, solvesso #100, solvesso #150, tetralin, n-propyl alcohol (12.2), n-butyl alcohol (11.6), tridecyl alcohol, cyclohexyl alcohol, 2-methylcyclohexyl alcohol, ethylene glycol (17.1), diethylene glycol (14.2), triethylene glycol, polyethylene glycol, propylene glycol (15.0), dipropylene glycol (11.5), glycerin (17.7), ethylene glycol monobutyl ether (9.9), diethylene glycol monoethyl ether (10.3), diethylene glycol monobutyl e.ther (9.8), ethylene glycol monoethyl ether acetate (9.4), ethylene glycol monobutyl ether acetate (8.9), diethylene glycol monoethyl ether acetate (9.5), diethylene glycol monobutyl ether acetate (9.1), ethyl acetate (8.9), isopropyl acetate (8.6), n-butyl acetate (8.7), methyl isobutyl ketone, methylcyclohexanone, isophorone (9.4), and diacetone alcohol (9.8).

The following are combinations of a copolymer resin and a dispersion medium which are preferable to use to produce the ink composition of the present invention.

(1) In production of gravure inks, toluene, xylene, n-hexane, or the like is generally used as a dispersion medium, in which limed rosin, zinc rosin, ester gum, gilsonite, or the like is dissolved as a binder resin. Examples of copolymer resins which are suitable for use with these dispersion mediums will be shown below.

First, copolymer resins which are preferable to use in combination with n-hexane (SP value: 7.3) when used as a dispersion medium will be shown below, together with the difference $\Delta\delta^1$ between the solubility parameter value $\delta p^1$ of a homopolymer composed only of one monomer component in each copolymer resin and the solubility parameter value $\delta s^1$ of the dispersion medium, the difference $\Delta\delta^2$ between the solubility parameter value $\delta p^2$ of a homopolymer composed only of the other monomer component and the SP value $\delta s^1$ of the dispersion medium, and the difference $\Delta$ between $\Delta\delta^1$ and $\Delta\delta^2$ ($\Delta\delta^1-\Delta\delta^2$). It should be noted that the numerical value in each pair of parentheses shows the solubility parameter value of a homopolymer which consists only of the monomer component concerned.

Ethylene (8.1)—vinyl acetate (9.4) copolymer resin: $\Delta\delta^1$= 0.8; $\Delta\delta^2$=2.1; and $\Delta(\Delta\delta^1-\Delta\delta^2)$=1.3

Ethylene (8.1)—methyl acrylate (9.7) copolymer resin: $\Delta\delta^1=0.8$; $\Delta\delta^2=2.4$; and $\Delta(\Delta\delta^1-\Delta\delta^2)=1.6$ Ethylene (8.1)—ethyl acrylate (9.2) copolymer resin: $\Delta\delta^1=0.8$; $\Delta\delta^2=1.9$; and $\Delta(\Delta\delta^1-\Delta\delta^2)=1.1$ Styrene (9.1)—isoprene (8.15) copolymer resin: $\Delta\delta^1=0.9$; $\Delta\delta^2=1.8$; and $\Delta(\Delta\delta^1-\Delta\delta^2)=0.9$ Lauryl methacrylate (8.2)—methyl methacrylate (9.3) copolymer resin: $\Delta\delta^1=0.9$; $\Delta\delta^2=2.0$; and $\Delta(\Delta\delta^1-\Delta\delta^2)=1.1$ Lauryl methacrylate (8.2)—ethyl methacrylate (9.1) copolymer resin: $\Delta\delta^1=0.9$; $\Delta\delta^2=1.8$; and $\Delta(\Delta\delta^1-\Delta\delta^2)=0.9$ Lauryl methacrylate (8.2)—methyl acrylate (9.7) copolymer resin: $\Delta\delta^1=0.9$; $\Delta\delta^2=2.4$; and $\Delta(\Delta\delta^1-\Delta\delta^2)=1.5$ Lauryl methacrylate (8.2)—ethyl acrylate (9.2) copolymer resin: $\Delta\delta^1=0.9$; $\Delta\delta^2=1.9$; and $\Delta(\Delta\delta^1-\Delta\delta^2)=1.0$ Lauryl methacrylate (8.2)—propyl acrylate (9.0) copolymer resin: $\Delta\delta^1=0.9$; $\Delta\delta^2=1.7$; and $\Delta(\Delta\delta^1-\Delta\delta^2)=0.8$ Stearyl methacrylate (8.2)—methyl methacrylate (9.3) copolymer resin: $\Delta\delta^1=0.9$; $\Delta\delta^2=2.0$; and $\Delta(\Delta\delta^1-\Delta\delta^2)=1.1$ Stearyol methacrylate (8.2)—ethyl methacrylate (9.1) copolymer resin: $\Delta\delta^1=0.9$; $\Delta\delta^2=1.8$; and $\Delta(\Delta\delta^1-\Delta\delta^2)=0.9$ Stearyl methacrylate (8.2)—methyl acrylate (9.7) copolymer resin: $\Delta\delta^1=0.9$; $\Delta\delta^2=2.4$; and $\Delta(\Delta\delta^1-\Delta\delta^2)=1.5$ Stearyl methacrylate (8.2)—ethyl acrylate (9.2) copolymer resin: $\Delta\delta^1=0.9$; $\Delta\delta^2=1.9$; and $\Delta(\Delta\delta^1-\Delta\delta^2)=1.0$ Stearyl methacrylate (8.2)—propyl acrylate (9.0) copolymer resin: $\Delta\delta^1=0.9$; $\Delta\delta^2=1.7$; and $\Delta(\Delta\delta^1-\Delta\delta^2)=0.8$ Isobornyl methacrylate (8.2)—methyl methacrylate (9.3) copolymer resin: $\Delta\delta^2=0.9$; $\Delta\delta^2=2.0$; and $\Delta(\Delta\delta^1-\Delta\delta^2)=1.1$ Isobornyl methacrylate (8.2)—ethyl methacrylate (9.1) copolymer resin: $\Delta\delta^1=0.9$; $\Delta\delta^2=1.8$; and $\Delta(\Delta\delta^1-\Delta\delta^2)=0.9$ Isobornyl methacrylate (8.2)—methyl acrylate (9.7) copolymer resin: $\Delta\delta^1=0.9$; $\Delta\delta^2=2.4$; and $\Delta(\Delta\delta^1-\Delta\delta^2)=1.5$ Isobornyl methacrylate (8.2)—ethyl acrylate (9.2) copolymer resin: $\Delta\delta^1=0.9$; $\Delta\delta^2=1.9$; and $\Delta(\Delta\delta^1-\Delta\delta^2)=1.0$ Isobornyl methacrylate (8.2)—propyl acrylate (9.0) copolymer resin: $\Delta\delta^1=0.9$; $\Delta\delta^2=1.9$; and $\Delta(\Delta\delta^1-\Delta\delta^2)=0.8$ t-butyl methacrylate (8.3)—methyl methacrylate (9.3) copolymer resin: $\Delta\delta^1=1.0$; $\Delta\delta^2=2.0$; and $\Delta(\Delta\delta^1-\Delta\delta^2)=1.0$ t-butyl methacrylate (8.3)—ethyl methacrylate (9.1) copolymer resin: $\Delta\delta^1=1.0$; $\Delta\delta^2=1.8$; and $\Delta(\Delta\delta^1-\Delta\delta^2)=0.8$ t-butyl methacrylate (8.3)—methyl acrylate (9.7) copolymer resin: $\Delta\delta^1=1.0$; $\Delta\delta^2=2.4$; and $\Delta(\Delta\delta^1-\Delta\delta^2)=1.4$ t-butyl methacrylate (8.3)—ethyl acrylate (9.2) copolymer resin: $\Delta\delta^1=1.0$; $\Delta\delta^2=1.9$; and $\Delta(\Delta\delta^1-\Delta\delta^2)=0.9$ t-butyl methacrylate (8.3)—propyl acrylate (9.0) copolymer resin: $\Delta\delta^1=1.0$; $\Delta\delta^2=1.7$; and $\Delta(\Delta\delta^1-\Delta\delta^2)=0.7$ The following is an example of a copolymer resin which is preferable to use in combination with toluene (8.9) when used as a dispersion medium, together with the solubility parameter value differences:

Styrene (9.1)—acrylonitrile (12.8) copolymer resin: $\Delta\delta^1=0.2$; $\Delta\delta^2=3.9$; and $\Delta(\Delta\delta^1-\Delta\delta^2)=3.7$ When o-xylene (8.8) is used as a dispersion medium, the following may be used as a copolymer resin:

Styrene (9.1)—acrylonitrile (12.8) copolymer resin: $\Delta\delta^1=0.3$; $\Delta\delta^2=4.0$; and $\Delta(\Delta\delta^1-\Delta\delta^2)=3.7$ (2) In production of a special gravure ink, when nitrocellulose is used as a binder resin, ethyl acetate, ethyl cellosolve, acetone, etc. may be used as a dispersion medium. When a vinyl resin is used as a binder resin, methyl ethyl ketone, methyl isobutyl ketone, etc. may be used. When a polyamide resin is used as a binder resin, isopropanol, etc. may be used.

The following are examples of copolymer resins which are preferable to use in combination with acetone (9.6) when used as a dispersion medium, together with the solubility parameter value differences:

n-hexyl methacrylate (8.6)—methyl acrylate (9.7) copolymer resin: $\Delta\delta^1=1.0$; $\Delta\delta^2=0.1$; and $\Delta(\Delta\delta^1-\Delta\delta^2)=0.9$ n-hexyl methacrylate (8.6)—ethyl acrylate (9.2) copolymer resin: $\Delta\delta^1=1.0$; $\Delta\delta^2=0.4$; and $\Delta(\Delta\delta^1-\Delta\delta^2)=0.6$ n-hexyl methacrylate (8.6)—methyl methacrylate (9.3) copolymer resin: $\Delta\delta^1=1.0$; $\Delta\delta^2=0.3$; and $\Delta(\Delta\delta^1-\Delta\delta^2)=0.7$ n-hexyl methacrylate (8.6)—ethyl methacrylate (9.1) copolymer resin: $\Delta\delta^1=1.0$; $\Delta\delta^2=0.5$; and $\Delta(\Delta\delta^1-\Delta\delta^2)=0.5$ The following are examples of copolymer resins which are preferable to use in combination with cellosolve (10.7) when used as a dispersion medium, together with the solubility parameter value differences:

Lauryl methacrylate (8.2)—methyl acrylate (9.7) copolymer resin: $\Delta\delta^1=2.5$; $\Delta\delta^2=1.0$; and $\Delta(\Delta\delta^1-\Delta\delta^2)=1.5$ Stearyl methacrylate (8.2)—methyl acrylate (9.7) copolymer resin: $\Delta\delta^1=2.5$; $\Delta\delta^2=1.0$; and $\Delta(\Delta\delta^1-\Delta\delta^2)=1.5$ Isobornyl methacrylate (8.2)—methyl acrylate (9.7) copolymer resin: $\Delta\delta^1=2.5$; $\Delta\delta^2=1.0$; and $\Delta(\Delta\delta^1-\Delta\delta^2)=1.5$ t-butyl methacrylate (8.3)—methyl acrylate (9.7) copolymer resin: $\Delta\delta^1=2.4$; $\Delta\delta^2=1.0$; and $\Delta(\Delta\delta^1-\Delta\delta^2)=1.4$ In production of an ink for color filter, when cellosolve acetate (SP value: 9.4) is used as a dispersion medium, it is possible to use styrene-butadiene copolymer resin, styrene-isoprene copolymer resin, styrene-vinyl acetate copolymer resin, ethylene-methyl methacrylate copolymer resin, ethylene-ethyl methacrylate copolymer resin, etc. in combination with the dispersion medium.

Styrene (9.1)—butadiene (8.4) copolymer resin: $\Delta\delta^1=0.3$; $\Delta\delta^2=1.0$; and $\Delta(\Delta\delta^1-\Delta\delta^2)=0.7$ Styrene (9.1)—isoprene (8.15) copolymer resin: $\Delta\delta^1=0.3$; $\Delta\delta^2=1.25$; and $\Delta(\Delta\delta^1-\Delta\delta^2)=0.95$ Ethylene (8.1)—vinyl acetate (9.4) copolymer resin: $\Delta\delta^1=1.3$; $\Delta\delta^2=0$; and $\Delta(\Delta\delta^1-\Delta\delta^2)=1.3$ Ethylene (8.1)—methyl methacrylate (9.3) copolymer resin: $\Delta\delta^1=1.3$; $\Delta\delta^2=0.1$; and $\Delta(\Delta\delta^1-\Delta\delta^2)=1.2$ Ethylene (8.1)—ethyl methacrylate (9.1) copolymer resin: $\Delta\delta^1 1.3$; $\Delta\delta^2=0.3$; and $\Delta(\Delta^1-\Delta\delta^2)=1.0$ The dispersion medium in the ink composition is required to satisfy the condition concerning the relation to the copolymer resin particles. In the case of a gravure ink, for example, the dispersion medium is further required to have solubility in a binder such as those described later and also solubility or dispersibility in other additives. The dispersion medium is preferably a liquid having moderate dryness. If necessary, a slow-drying solvent may be jointly used to control the quick-drying properties of the ink. In selection of a slow-drying solvent, however, it is necessary to take into consideration the above-described conditions required for a solvent as used in the present invention.

Regarding the diameter of the copolymer resin particles in the ink composition, the particle diameter should be properly selected according to the use application of the ink composition and the physical properties demanded. However, it is preferable that the particle diameter should be properly adjusted in the range of from 0.1 µm to 100 µm in general. The content of copolymer resin particles in the ink composition is preferably in the range of from 15% to 60%, more preferably from 20% to 50%, by weight. The copolymer resin particle content can be made higher than in the case of the conventional ink compositions.

The copolymer resin particles are each present in the ink composition in such a state that a portion thereof which is insoluble in the dispersion medium constitutes a nucleus, and a portion thereof which has an affinity for the dispersion medium constitutes an outer skin portion. By virtue of the surface affinity for the dispersion medium, aggregation-or precipitation will not occur even if the particle concentration is increased. Thus, an ink composition having excellent dispersion stability can be obtained.

Further, the copolymer resin particles in the present invention may contain a pigment. Organic or inorganic pigments which are usually used in ink compositions may be used. Examples of yellow pigments usable in the present invention are azo pigments, i.e. monoazo, disazo and polyazo pigments, organic pigments, i.e. isoindolinone, and, inorganic pigments, i.e. chrome yellow, yellow iron oxide, cadmium yellow, titanium yellow, antimony yellow, etc. Examples of red pigments usable in the present invention are azo pigments, i.e. mono, disazo and polyazo pigments, organic pigments, i.e. quinacridone, and inorganic pigments, i.e. iron oxide red, vermilion, cadmium red, chrome vermilion, etc. Examples of blue pigments usable in the present invention are organic pigments, i.e. Phthalocyanine Blue, Indanthrene Blue, etc., and inorganic pigments, i.e. iron blue, ultramarine blue, cobalt blue, etc. Examples of black pigments usable in the present invention are organic pigments, i.e. aniline black, and inorganic pigments, i.e. carbon black. Examples of white pigments usable in the present invention are inorganic pigments, i.e. titanium dioxide, zinc white, diantimony trioxide, etc.

Examples of bright pigments usable in the present invention are metallic powder pigments having metallic luster, such as metal powders, e.g. aluminum powder, copper powder, brass powder, etc. metallic foil, metal-deposited synthetic resin film chips, and so forth. Examples of other pigments usable in the present invention are pearlescent pigments having pearly luster or interference luster, i.e. titanium dioxide-coated mica, fish scale guanine, bismuth trichloride, etc. It is also possible to use light-interference powdery pigments such as pigments comprising chips or powder obtained by cutting a film formed by laminating resin layers of two or more different kinds of material which differ from each other in the refractive index, for example, a polyester resin layer and an acrylic resin layer, with a thickness of the order of several µm or less so that iris color is produced by interference of light. Other examples include matte pigments comprising fine powders of calcium carbonate, barium sulfate, silica, alumina, glass balloon, polyethylene, etc., which have a particle diameter of the order of 0.1 µm to 10 µm.

It is also possible to use bead pigments comprising finely-divided spherical resin particles which may contain coloring material such as a pigment, a dye, etc. according to need. A bead pigment which is particularly excellent in matte effect and resistance to scuffing can be obtained by dispersing a commonly used pigment fine powder, e.g. iron sesquioxide, titanium dioxide, calcium carbonate, quinacridone, etc., in a composition of an elastic resin, e.g. polyurethane resin, epoxy resin, acrylic resin, polyester resin, polyamide resin, fluorine resin, vinyl chloride-vinyl acetate copolymer, etc., which may be mixed with a plasticizer, stabilizer, surface-active agent, etc., if necessary, or by coating such a pigment with the above-described composition, thereby forming spherical or sphere-like particles. Particularly excellent matte effect is produced when the pigment particle diameter distribution is in the range of from 5 µm to 80 µm, and the maximum value in the distribution is in the range of from 10 µm to 35 µm. If necessary, a bead pigment having no coloring agent added thereto may be used, and it is also possible to use a mixture of two or more bead pigments giving differerSt colors. Such a bead pigment is particularly suitable for suede-like matte finish.

Examples of weather-resistant pigments usable in the present invention are as follows:

Yellow pigments: organic pigments, i.e., isoindolinone, Threne Yellow G, Permanent Yellow HR, etc.; and inorganic pigments, i.e. yellow iron oxide, nickel-titanium yellow, etc.

Red pigments: organic pigments, i.e. quinacridone red, Permanent Red FGR, Permanent Red F4RH, etc.; and inorganic pigments, i.e. iron oxide red, cadmium mercury sulfide, etc.

Blue pigments: organic pigments, i.e. Phthalocyanine Blue, Indanthrene Blue RS, etc.; and inorganic pigments, i.e. ultramarine blue, iron blue, etc.

Black pigments: carbon black, etc.

White pigments: titanium dioxide, diantimony trioxide.

The pigment particle diameter is determined according to the diameter of copolymer resin particles required for the use application of the ink composition. In general, however, it is possible to use a pigment having a particle diameter in the range of from 0.1 µm to 100 µm.

When the ink composition of the present invention is to be used for gravure printing, for example, the copolymer resin particle diameter must be sufficiently smaller than the depth and cell diameter of the plate used. Therefore, it is preferable to use a pigment having a particle diameter in the range of from 0.1 µm to 10 µm, in general.

Such a pigment can be contained in the copolymer resin particles in an amount of up to 80% by weight, preferably not higher than 75% by weight. In the ink composition of the present invention, the content of copolymer resin particles can be increased without causing problems such as aggregation, sedimentation, etc. in contrast to the conventional ink compositions, as described above. Therefore, the pigment content can be markedly increased, and the ink composition can also be improved in coatability.

In the ink composition of the present invention, the copolymer resin particles containing a pigment as mentioned above can be adapted to function as a binder resin. However, the ink composition may contain a binder resin which may be properly selected according to the use application of the ink composition and the physical properties demanded. It is necessary for the binder resin to be different from the copolymer resin that forms copolymer resin particles, and to be dissolved in the dispersion medium.

That is, the binder resin needs to be dissolved in the dispersion medium under the following conditions: In a case where the binder resin is a homopolymer, the homopolymer must have an SP value similar to that of the dispersion medium and be dissolved therein in a monomolecular state.

When the binder resin is a copolymer resin, even if it has an insoluble component, the resin must not have a particulate form in the dispersion medium.

Such a binder resin may be properly selected from among thermoplastic resin, thermosetting resins, ionizing. radiation-curing resins, etc. according to the use application of the ink composition and also to the physical properties demanded and by taking into consideration printability and the like.

Examples of thermoplastic resins usable in the present invention are cellulose derivatives, i.e. ethyl cellulose, cellulose nitrate, cellulose acetate, ethylhydroxyethyl cellulose, cellulose acetate propionate, etc., styrene resins or styrene copolymer resins, i.e. polystyrene, poly-α-methylstyrene, etc., acrylic resins, i.e. polymethyl methacrylate, polyethyl methacrylate, polyethyl acrylate, polybutyl acrylate, etc., vinyl polymers, i.e. polyvinyl chloride, polyvinyl acetate, vinyl chloride-vinyl acetate copolymer, polyvinyl butyral, etc., rosin ester resins, i.e. rosin, rosin-modified maleic acid resin, rosin-modified phenolic resin, polymerized rosin, etc., and other natural or synthetic resins, i.e. cumarone resin, vinyl toluene resin, polyamide resin, etc.

Examples of thermosetting resins usable in the present invention are phenolic resin, urea resin, diallyl phthalate resin, melamine resin, guanamine resin, unsaturated polyester resin, polyurethane resin, epoxy resin, amino alkyd resin, melamine-urea co-condensation resin, silicone resin, polysiloxane resin, etc. Further, a crosslinking agent, a polymerization initiator, or other curing agent, a polymerization promotor, a viscosity modifier, etc. may be properly added as additives. When the thermosetting resin is an unsaturated polyester resin or a polyurethane.resin, an isocyanate may be used as a curing agent. When an epoxy resin is used as a thermosetting resin, an amine may be used as a curing agent. When an unsaturated polyester resin is used as a thermosetting resin, it is preferable to use a peroxide, e.g. methyl ethyl ketone peroxide, or a radical forming agent, e.g. azobisisobutyronitrile.

As isocyanates, it is possible to use aliphatic or aromatic isocyanates possessing a valence of two or more. However, it is preferable to use aliphatic isocyanates from the viewpoint of thermal discoloration prevention and weather resistance. Specific examples of aliphatic isocyanates are tolylene diisocyanate, xylene diisocyanate, 4,4-diphenylmethane diisocyanate, hexamethylene diisocyanate, lysine diisocyanate, etc.

To promote the curing reaction, the ink composition may be heated after coating, if necessary. For example, in the case of an isocyanate-cured urethane curing unsaturated polyester resin or polyurethane resin, the ink composition is generally heated for about 1 to 5 days at a temperature in the range of from 40° C. to 60° C. In the case of a polysiloxane resin, the ink composition is generally heated for about 1 to 30 minutes at a temperature in the range of from 80° C. to 150° C.

As an ionizing radiation-curing resin, it is possible to use a composition properly mixed with a prepolymer, an oligomer and/or a monomer, which has a polymerizable unsaturated bond or an epoxy group in a molecule thereof.

Examples of prepolymers and oligomers usable in the present invention are unsaturated polyesters such as condensation products formed from an unsaturated dicarboxylic acid and a polyhydric alcohol. Other examples include methacrylates, i.e. polyester methacrylate, polyether methacrylate, polyol methacrylate, melamine methacrylate, etc., acrylates, i.e. polyester acrylate, epoxy acrylate, urethane acrylate, polyether acrylate, polyol acrylate, melamine acrylate, etc., and silicon resins, i.e. siloxane, etc.

Examples of monomers usable in the present invention are styrene monomers, i.e. styrene, α-methylstyrene, etc., acrylic esters, i.e. methyl acrylate, 2-ethylhexyl acrylate, methoxyethyl acrylate, butoxyethyl acrylate, butyl acrylate, methoxybutyl acrylate, phenyl acrylate, etc., methacrylic acid esters, i.e. methyl methacrylate, ethyl methacrylate, propyl methacrylate, methoxyethyl methacrylate, ethoxymethyl methacrylate, phenyl methacrylate, lauryl methacrylate, etc., unsaturated acid-substituted amino-alcohol esters, i.e. 2-(N,N-diethylamino)ethyl acrylate, 2-(N,N-diethylamino)ethyl methacrylate, 2-(N,N-dibenzylamino)ethyl acrylate, 2-(N,N-dimethylamino)methyl methacrylate, 2-(N,N-diethylamino)propyl acrylate, etc., unsaturated carboxylic acid amides, i.e. acrylamide, methacrylamide, etc., compounds, i.e. ethylene glycol diacrylate, propylene glycol diacrylate, neopentyl glycol diacrylate, 1,6-hexane diol diacrylate, diethylene glycol diacrylate, triethylene glycol diacrylate, etc., multifunctional compounds, i.e. dipropylene glycol diacrylate, ethylene glycol acrylate, propylene glycol dimethacrylate, diethylene glycol dimethacrylate, etc., polythiol compounds having two or more thiol radicals per molecule thereof, e.g. trimethylolpropane trithiopropylate, pentaerythritol tetrathioglycol, etc., and mixtures of the above-described monomers. To give coatability to the resin composition, it is preferable to mix together not less than 5% by weight of the above-described prepolymer or oligomer and not more than 95% by weight of the above-described monomer and/or polythiol.

When the cured product is required to exhibit flexibility, the amount of monomer used is somewhat reduced in a range within which no problem arises in terms of coatability. Alternatively, a unifunctional or bifunctional acrylate monomer is used to form a structure of relatively low crosslink density. When the cured product is required to exhibit heat resistance, hardness, solvent resistance, etc., the amount of monomer used is somewhat increased in a range within which no problem arises in terms of coatability. Alternatively, it is preferable to use a tri- or higher-functional acrylate monomer to form a structure of high crosslink density. It is also possible to adjust the coatability and the physical properties of the cured product by mixing together a uni- or bi-functional monomer and a tri- or higher-functional monomer.

Examples of such unifunctional acrylate monomers are 2-hydroxy acrylate, 2-hexyl acrylate, phenoxyethyl acrylate, etc. Examples of bifunctional acrylate monomers are ethylene glycol diacrylate, 1,6-hexane diol diacrylate, etc. Examples of tri- or higher-functional acrylate monomers are trimethylolpropane triacrylate, pentaerythritol hexaacrylate, dipentaerythritol hexaacrylate, etc.

To adjust physical properties of the cured product, such as flexibility, surface hardness, etc., an ionizing radiation non-curing resin is preferably mixed with an ionizing radiation-curing resin as mentioned above in an amount of 1% to 70%, more preferably, 5% to 50%, by weight with respect to at least one of the above-described three difference kinds of material, that is, prepolymer, oligomer and monomer.

Examples of ionizing radiation non-curing resins usable in the present invention are thermoplastic resins, i.e. urethanes, celluloses, polyesters, acrylic resins, butyral resins, polyvinyl chloride, polyvinyl acetate, etc. Among these resins, cellulose, urethane and butyral resins are particularly preferable from the viewpoint of flexibility.

When the material is to be cured by ultraviolet light in particular, the above-described ionizing radiation-curing resin composition may be mixed with a photopolymerization initiator and/or a photosensitizer. Examples of photopolymerization initiators usable in the present invention are acetophenones, benzophenones, Michler's benzoylbenzoate, e.g., thioxanthone, etc. Examples of photosensitizers usable in the present invention are n-butylamine, triethylamine, tri-n-butyl phosphine, etc.

Ionizing radiations usable in the present invention are electromagnetic waves or charged particle beams which have an amount of energy sufficient to polymerize and crosslink molecules. Ultraviolet light or electron radiation are usually used. Examples of ultraviolet light sources usable in the present invention are a super-high pressure mercury vapor lamp, a high-pressure mercury vapor lamp, a low-pressure mercury vapor lamp, a carbon arc lamp, a black light lamp, and a metal halide lamp. Examples of electron radiation sources usable in the present invention are various types of electron beam accelerator, such as a Cockcroft-Walton accelerator, an insulated-core transformer type accelerator, a linear accelerator, a high-frequency accelerator, etc. The electron radiation source used in the present invention radiates electrons having an energy in the range of from 100 to 1,000 keV, preferably from 100 to 300 keV. The irradiation dose is usually in the range of from 0.5 to 30 Mrad.

When a thermoplastic resin is used as a binder resin, it is preferable for the ink composition of the present invention to contain from 5% to 50%, more preferably from 10% to 30%, by weight of a thermoplastic resin. When a thermosetting resin or an ionizing radiation-curing resin is used, the resin content in the ink composition is preferably in the range of from 3% to 30, more preferably from 5% to 25%, by weight.

Further, a dispersant may be added to the ink composition of the present invention. Since the copolymer resin particles in the present invention per se have an excellent affinity for the dispersion medium, it is not always necessary to add a dispersant to the ink composition. However, if the granulation step for forming copolymer resin particles is carried out in the presence of a dispersant, the dispersibility of the resin in the good solvent can be improved, and entanglement of molecular chains can be effectively controlled when resin particles are formed. Therefore, it is possible to form resin particles having a further reduced particle diameter. That is, it is possible to obtain a particle size of the order of submicrons and to narrow the particle size distribution. Further, in the resin particle dispersion thus obtained, the dispersant has the above-described granulation control function and also functions so as to enable the resin particles to be stably dispersed in the solvent.

Examples of dispersants which are suitable for use in the present invention are metallic soaps, i.e. zirconium naphthenate, aluminum stearate, etc., natural phosphoric esters, i.e. lecithin, etc., aliphatic amines, anionic surface-active agents, cationic surface-active agents, nonionic surface-active agents, etc. In addition, polymer dispersants, e.g. polyhydroxycarboxylic acid esters, may be suitably used in the present invention.

A hydroxycarboxylic acid ester, which is a polymerization raw material of a polyhydroxycarboxylic acid ester, is an ester derivative of HO-X-COOH, where X is a bivalent saturated or unsaturated aliphatic hydrocarbon containing at least 12 carbon atoms, or a bivalent aromatic hydrocarbon containing at least 6 carbon atoms. Further, at least 4 carbon atoms are present between the hydroxyl group and the carboxyl group. Preferable examples of such hydroxycarboxylic acid derivatives are hydroxycarboxylic acid alkyl esters, i.e. 12-hydroxystearic acid methyl ester, 12-hydroxystearic acid ethyl ester, etc., metal salts of hydroxycarboxylic acids, i.e. 12-lithium hydroxycarboxylate, 12-aluminum hydroxycarboxylate, etc. etc., hydroxycarboxylic acid amide, hardened castor oil, and so forth.

Polyhydroxycarboxylic acid esters include various forms: one which is obtained by polymerization in which a hydroxycarboxylic acid ester is partially saponified in the presence of a small amount of an amine or a catalyst; another which is obtained by esterification between molecules; and another which is obtained by esterification in molecules.

Preferable polyhydroxycarboxylic acid esters are condensation products of from 3 to 10 hydroxycarboxylic acid ester molecules, which are light-gray brown wax-like substances. A polyhydroxycarboxylic acid ester having a polymerization degree which is smaller than 3 or larger 10 is not compatible with a dispersion medium such as n-hexane. Therefore, such a polyhydroxycarboxylic acid ester provides no resin particles having the desired particle diameter distribution even if it is used in the granulation step. There is no specific restriction on the amount of polyhydroxycarboxylic acid ester to be added to the ink composition of the present invention. However, the polyhydroxycarboxylic acid ester may be used in an amount of from 0.01% to 200% by weight of the weight of the resin.

These dispersants are preferably added to the copolymer resin in an amount of not more than 10%, more preferably not more than 5%, by weight of the weight of the copolymer resin in the granulation step in the ink composition producing process, described later. In the resulting ink composition, the dispersant content is preferably not more than 5%, more preferably not more than 2.5%, by weight.

If necessary, the ink composition of the present invention may be further mixed with a drier and a skinning agent for the purpose of drying control, a compound and a thickening agent for the purpose of viscosity control, a toner and a matting agent for the purpose of color tone control, a wetting agent, an anti-foaming agent, a mildew-proofing agent, etc.

Next, the ink composition producing method of the present invention will be explained.

The ink composition producing method of the present invention includes the steps of:
(1) dissolving a copolymer resin in a solvent to prepare a copolymer resin solution;
(2) mixing the copolymer resin solution with a dispersion medium in the presence or absence of a pigment to carry out granulation for forming copolymer resin particles;
(3) removing the solvent from the solution; and
(4) preparing a desired ink.

First, the solvent that is used in the step (1) is preferably a solvent which can dissolve the copolymer resin at room temperature, and which has an SP value which is similar to both the SP value $\delta p^1$ of a homopolymer composed only of at least one monomer component and the SP value SP value $\delta p^2$ of a homopolymer composed only of at least one other monomer component. In the case of ethylene-vinyl acetate copolymer resin, for example, the SP value of polyethylene is 7.8, and the SP value of polyvinyl acetate is 9.3. Therefore, it can be dissolved in tetrahydrofuran, for example. In this case, the copolymer resin may fail to dissolve or swell in the solvent according to the chemical composition thereof. However, if the condition of dispersion of monomolecular chains is favorable, it will be good even if the copolymer resin is in an insoluble state. If a dispersant is added to the solution in an amount in the range of from 0.3% to 0.5% by weight, a favorable resin dispersion condition can be obtained. The copolymer resin may be dissolved in the solvent at a concentration of not more than 30% by weight. However, it is preferable to dissolve the copolymer resin in an amount in the range of from 5% to 10%, by weight, to thereby prepare a dilute solution.

Next, in the granulation step (2), the solution prepared in the step (1) is mixed with a dispersion medium having the following relationship with the copolymer resin. That is, the copolymer resin and the dispersion medium have the relationship that the difference $\Delta\delta^1$ between the solubility parameter value $\delta p^1$ of a homopolymer composed only of at least one monomer component in the copolymer resin and the solubility parameter value of the dispersion medium is not smaller than 1.0, and that the difference $\Delta\delta^2$ between the solubility parameter value $\delta p^2$ of a homopolymer composed only of at least one other monomer component and the solubility parameter value of the dispersion medium is not larger than 1.0, and further that the difference $\Delta$ between $\Delta\delta^1$ and $\Delta\delta^2$ ($\Delta\delta^1-\Delta\delta^2$) is at least 0.5. A solvent which satisfies the above-described relationship should be selected and used as a dispersion medium.

In the case of the tetrahydrofuran solution of ethylene-vinyl acetate copolymer resin, for example, the solution is preferably added to, for example, n-hexane (SP value: 7.3). That is, $\Delta\delta^1$ is 9.4−7.3=2.1; $\Delta\delta^2$ is 8.1−7.3=0.8; and $\Delta(\Delta\delta^1-\Delta\delta^2)$ is 1.3. Accordingly, n-hexane satisfies the above-described relationship, and is a suitable dispersion medium in this case. When the tetrahydrofuran solution is added to n-hexane, precipitation of resin particles is clearly observed. In this case, Isopar G, which has an SP value similar to that of n-hexane, may also be used in the same way as the above.

If necessary, a pigment is added to the resin solution or the dispersion medium at this stage, thereby granulating the resin in the presence of the pigment. By doing so, it is possible to form copolymer resin particles containing the pigment. Since the solution is added to the dispersion medium, which is a poor solvent, the resin molecular chains dispersed in the solution are entangled with each other in such a manner as to wrap the pigment therein, and in this way, copolymer resin particles are formed. The resin particle surface that wraps the pigment therein constitutes a soluble or swellable portion of the copolymer resin. Accordingly, even if the copolymer resin contains a pigment, there is no contact between pigment particles, and the dispersion stability can be improved. The granulation may be carried out in the presence of a dispersant so that the granulation control function is performed, as described above, and the dispersion stability of the resin particles formed is further improved.

The diameter of resin particles obtained in this way is in the range of from 0.1 µm to 100 µm. Even if sedimentation occurs, the resin particles can be readily redispersed by stirring. It is preferable from the viewpoint of granulation that the solvent used to prepare the resin solution should be removed by decantation, evaporation, etc. To adjust the resin particle diameter, the resin particles may be further finely divided by using a ball mill, an attriter, a sand grinder, a Kady mill, a three-roll mill, etc.

The resin particle dispersion thus obtained is then mixed with additives such as a concentration adjusting agent, a binder resin, etc. according to the use application, thereby preparing a desired ink composition.

The ink composition of the present invention will be explained below more specifically by way of examples. It should be noted that, in the examples, the term "parts" means parts by weight, and "%" means per cent by weight.

EXAMPLE 6

Production Example 1 of Copolymer Resin Particle Dispersion

Copolymer resin particle dispersions were produced by the following method using three different types of ethylene-vinyl acetate copolymer resin, that is, EVA250 [manufactured by Mitsui-Du Pont Chemical; vinyl acetate content: 28%; and MFR=15 dg/min], EVA450 [manufactured by Mitsui-Du Pont Chemical; vinyl acetate content: 19%; and MFR=15 dg/min], and EVA550 [manufactured by Mitsui-Du Pont Chemical; vinyl acetate content: 14%; and MFR= 15 dg/min].

2.5 g of each copolymer resin was cast into 100 g of tetrahydrofuran, and then dispersed therein at room temperature by using an ultrasonic homogenizer, thereby dissolving the copolymer resin in the solvent. Thereafter, the resulting solution was added to 500 g of n-hexane at room temperature with the ultrasonic homogenizer being irradiated. Next, the tetrahydrofuran was removed by using an evaporator, thereby obtaining a copolymer resin particle dispersion.

The particle size distribution and particle diameter ($D_{50}$ value) of the copolymer resin particles in each dispersion thus obtained were measured by using Microtrac-IISRA, manufactured by Nikkiso. The results of the measurement are shown in Table 5 below.

As to the particle size distribution, in the case of the dispersion prepared by using EVA250, the normal distribution was observed between 0.43 µm and 7.46 µm. In the case of EVA450, the normal distribution was observed between 0.66 µm and 14.92 µm. In the case of EVA550, the normal distribution was observed between 2.63 µm and 40.13 µm.

Even after the dispersions obtained as described above had been allowed to stand for 6 months, no aggregation of particles was observed. Thus, the dispersions had excellent dispersion stability.

TABLE 5

| Resin | Vinyl acetate content (%) | Particle diameter ($D_{50}$ value, µm) |
|---|---|---|
| EVA250 | 28 | 2.38 |
| EVA450 | 19 | 5.39 |
| EVA550 | 14 | 19.94 |

It will be understood from Table 5 that, as the vinyl acetate monomer content decreases, while the ethylene content incr. eases, the diameter of the resulting particles increases. These resins have the same MFR value, and the molecular weights of the resins are estimated to be substantially equal to each other. Therefore, it will be understood that the particle diameter difference is not attributable to the difference in molecular weight difference.

Production Example 2 of Copolymer Resin Particle Dispersion 5.0 g of styrene-butadiene copolymer resin [Pliolite S-5E, manufactured by Goodyear; styrene content: 20%; and weight-average molecular weight: 71,000], and 5.0 g of a yellow pigment [Disazo Yellow HR (C.I. No. 83)] were dispersed in 100 g of cyclohexane for 5 minutes at 25° C. by using an ultrasonic homogenizer, thereby preparing a dispersion. Thereafter, 400 g of cellosolve acetate (SP value: 9.4) at 25° C. was added to the dispersion with the ultrasonic homogenizer being irradiated. Thus, the dispersing process was further carried out for 15 minutes.

After the dispersing process, the cyclohexane was removed by using an evaporator, thereby obtaining a copolymer resin particle dispersion.

The particle size distribution and particle diameter ($D_{50}$ value) of the copolymer resin particles in the dispersion thus obtained were measured by using Microtrac-IISRA, manufactured by Nikkiso. The copolymer resin particles had a normal distribution between 0.17 μm and 1.01 μm and a D50 value of 0.36 μm.

Even after the dispersion obtained as described above had been allowed to stand for 6 months, no aggregation of particles was observed. Thus, the dispersion had excellent dispersion stability.

Preparation of Color Filter Ink

The copolymer resin particle dispersion prepared in the above-described Production Example 2 was processed by using an ultrasonic homogenizer and glass beads so that the resin particle diameter was further reduced. Thereafter, the dispersion medium (cellosolve acetate) was removed by using an evaporator, and thus the dispersion was concentrated until the total solid content reached 20% (pigment content: 10%), thereby preparing a color filter ink.

Even after the color filter ink had been allowed to stand for 6 months, no aggregation of particles was observed. Thus, the ink had excellent dispersion stability.

When the color filter ink was coated on a glass substrate coated with an indium tin oxide film by using a spin coater, the ink exhibited excellent fluidity, so that a satisfactorily smooth surface was obtained. Thus, the color filter ink was superior in coatability.

EXAMPLE 7

Preparation of Ink for Gravure Printing 5.0 g of styrene-isoprene copolymer resin [Kraton D1112, manufactured by Shell Japan; styrene content: 14%; and MFR=23 dg/min], and 5.0 g of a red pigment [Brilliant Carmine 6B (C.I. No. 57:1] were dispersed in 100 g of tetrahydrofuran for 5 minutes at 25° C. by using an ultrasonic homogenizer, othereby preparing a dispersion. Thereafter, 400 g of n-hexane at 25° C. was added to the dispersion with the ultrasonic homogenizer being irradiated. Thus, the dispersing process was further carried out for 15 minutes.

After the dispersing process, the tetrahydrofuran was removed by using an evaporator. Thereafter, the dispersion was further concentrated to obtain a copolymer resin particle dispersion having a total solid content of 30%.

The particle size distribution and particle diameter ($D_{50}$ value) of the copolymer resin particles in the dispersion thus obtained were measured by using Microtrac-IISRA, manufactured by Nikkiso. The copolymer resin particles had a normal distribution between 0.17 μm and 5.27 μm and a $D_{50}$ value of 0.81 μm.

Next, 30 parts of a rosin-modified phenolic resin (Pentalyn 859, manufactured by Hercules Powder) was dissolved in 100 parts of the copolymer resin particle dispersion obtained as described above. Thereafter, the dispersing process was further carried out for 15 minutes at 25° C. by using an ultrasonic homogenizer. Further, with glass beads added thereto, the dispersion was shaken for 5 hours by using a paint shaker, thereby preparing an ink for gravure printing.

Even after the gravure printing ink had been allowed to stand for 6 months, neither sedimentation nor aggregation of particles was observed. Thus, the ink had excellent dispersion stability.

What we claim is:

1. A method of producing a liquid toner, said method comprising the steps of:

dissolving a copolymer resin which is composed of at least two different monomer components in a solvent to prepare a solution;

mixing said solution with an electrically insulating dispersion medium to carry out granulation for forming copolymer resin particles in such a relationship that a difference $\Delta\delta^1$ between a solubility parameter value $\delta p^1$ of a homopolymer composed only of at least one monomer component in said copolymer resin and a solubility parameter value $\delta s^1$ of said dispersion medium is not smaller than 1.0, and that a difference $\Delta\delta^2$ between a solubility parameter value $\delta p^2$ of a homopolymer composed only of at least one other monomer component and the solubility parameter value $\delta s^1$ of said dispersion medium is not larger than 1.0, and further that a difference $\Delta$ between $\Delta\delta^1$ and $\Delta\delta^2$ ($\Delta\delta^1$–$\Delta\delta^2$) is at least 0.5; and removing said solvent, thereby forming copolymer resin particles each comprising a nuclear portion which is insoluble in said dispersion medium, and an outer skin portion which wraps said nuclear portion, and which is soluble or swellable in said dispersion medium.

2. A liquid toner producing method according to claim 1, wherein said copolymer resin particles are formed in the presence of a pigment so that said copolymer resin particles contain said pigment.

3. A method of producing an ink composition, said method comprising the steps of:

dissolving a copolymer resin which is composed of at least two different monomer components in a solvent to prepare a solution;

mixing said solution with a dispersion medium to carry out granulation for forming copolymer resin particles in such a relationship that a difference $\Delta\delta^1$ between a solubility parameter value $\delta p^1$ of a homopolymer composed only of at least one monomer component in said copolymer resin and a solubility parameter value of said dispersion medium is not smaller than 1.0, and that a difference $\Delta\delta^2$ between a solubility parameter value $\delta p^2$ of a homopolymer composed only of at least one other monomer component and the solubility parameter value of said dispersion medium is not larger than 1.0, and further that a difference $\Delta$ between $\Delta\delta^1$ and $\Delta\delta^2$ ($\Delta\delta^1$–$\Delta\delta^2$) is at least 0.5; and removing said solvent, thereby forming copolymer resin particles each comprising a nuclear portion which is insoluble in said dispersion medium, and an outer skin portion which wraps said nuclear portion, and which is soluble or swellable in said dispersion medium.

4. An ink composition producing method according to claim 3, wherein said copolymer resin particles are formed in the presence of a pigment so that said copolymer resin particles contain said pigment.

* * * * *